US011756056B2

(12) United States Patent
Advani

(10) Patent No.: US 11,756,056 B2
(45) Date of Patent: Sep. 12, 2023

(54) COLLECTION OF CONSUMER FEEDBACK ON DISPENSED PRODUCT SAMPLES TO GENERATE MACHINE LEARNING INFERENCES

(71) Applicant: Georama, Inc., Chicago, IL (US)

(72) Inventor: Nihal Advani, Chicago, IL (US)

(73) Assignee: Georama, Inc., Chicago, IL (US)

(*) Notice: Subject to any disclaimer, the term of this patent is extended or adjusted under 35 U.S.C. 154(b) by 0 days.

(21) Appl. No.: 16/993,891

(22) Filed: Aug. 14, 2020

(65) Prior Publication Data

US 2021/0217032 A1 Jul. 15, 2021

Related U.S. Application Data

(60) Provisional application No. 62/959,864, filed on Jan. 10, 2020.

(51) Int. Cl.
*G06Q 30/0201* (2023.01)
*G06Q 30/0203* (2023.01)
*G06N 20/00* (2019.01)
*G07F 17/00* (2006.01)
*G07F 9/00* (2006.01)
*G06V 20/10* (2022.01)
*G06V 10/764* (2022.01)
(Continued)

(52) U.S. Cl.
CPC ......... *G06Q 30/0201* (2013.01); *G06N 20/00* (2019.01); *G06Q 30/0203* (2013.01); *G06V 10/764* (2022.01); *G06V 20/10* (2022.01); *G06V 20/46* (2022.01); *G06V 40/175* (2022.01); *G07F 9/002* (2020.05); *G07F 17/0064* (2013.01)

(58) Field of Classification Search
USPC ........................................................ 705/7.32
See application file for complete search history.

(56) References Cited

U.S. PATENT DOCUMENTS

2001/0052122 A1* 12/2001 Nanos ................... G06Q 30/02
725/9
2007/0097234 A1* 5/2007 Katayama ............. G06Q 10/00
348/239
(Continued)

OTHER PUBLICATIONS

Gruen et al., NuiVend—Next Generation Vending Machine, 2016, International Conference on Computation Science and Computational Intelligence (Year: 2016).*

(Continued)

*Primary Examiner* — Brian M Epstein
*Assistant Examiner* — Allison M Neal
(74) *Attorney, Agent, or Firm* — Fish & Richardson P.C.

(57) ABSTRACT

A system for interactive product sampling and obtaining real-time consumer feedback to generate qualitative insights is described. The system may include an interactive imaging device, a sampling subsystem, a graphical user interface, a back-end system. The sampling subsystem dispenses product samples and obtains audio, video, or textual feedback from consumers. The system may perform sentimental and emotional analysis of video feedback to capture facial expressions and reactions of the consumer consuming the product samples. The system may use a trained model to generate qualitative insights from the feedback. Related methods, computer readable media, computer program product, apparatuses, and techniques are also described.

18 Claims, 19 Drawing Sheets

(51) Int. Cl.
*G06V 20/40* (2022.01)
*G06V 40/16* (2022.01)

(56) References Cited

U.S. PATENT DOCUMENTS

| | | | | |
|---|---|---|---|---|
| 2010/0268792 | A1* | 10/2010 | Butler | G07F 11/00 709/217 |
| 2011/0282724 | A1* | 11/2011 | Hwang | G06Q 30/0217 705/14.19 |
| 2011/0295417 | A1* | 12/2011 | Smith, III | G07F 9/002 700/235 |
| 2015/0248162 | A1* | 9/2015 | Masson | G06F 3/017 345/173 |
| 2017/0169486 | A1* | 6/2017 | Farronato | G06Q 30/0282 |
| 2017/0238753 | A1* | 8/2017 | Merali | A47J 31/521 |
| 2017/0345245 | A1* | 11/2017 | Torresani | H04W 4/80 |
| 2018/0232678 | A1* | 8/2018 | Chirayil | G06K 9/00536 |
| 2019/0244465 | A1* | 8/2019 | Saunders | G06Q 20/18 |
| 2019/0385730 | A1* | 12/2019 | Baugh | G16H 20/90 |
| 2020/0082369 | A1* | 3/2020 | Smith | G07F 11/1653 |
| 2021/0192484 | A1* | 6/2021 | Forutanpour | G06Q 20/18 |

OTHER PUBLICATIONS

PCT International Search Report and Written Opinion in International Appln. No. PCT/US2021/012730, dated Mar. 3, 2021, 13 pages.

International Preliminary Report on Patentability in International Appln. No. PCT/US2021/012730, dated Jul. 21, 2022, 11 pages.

* cited by examiner

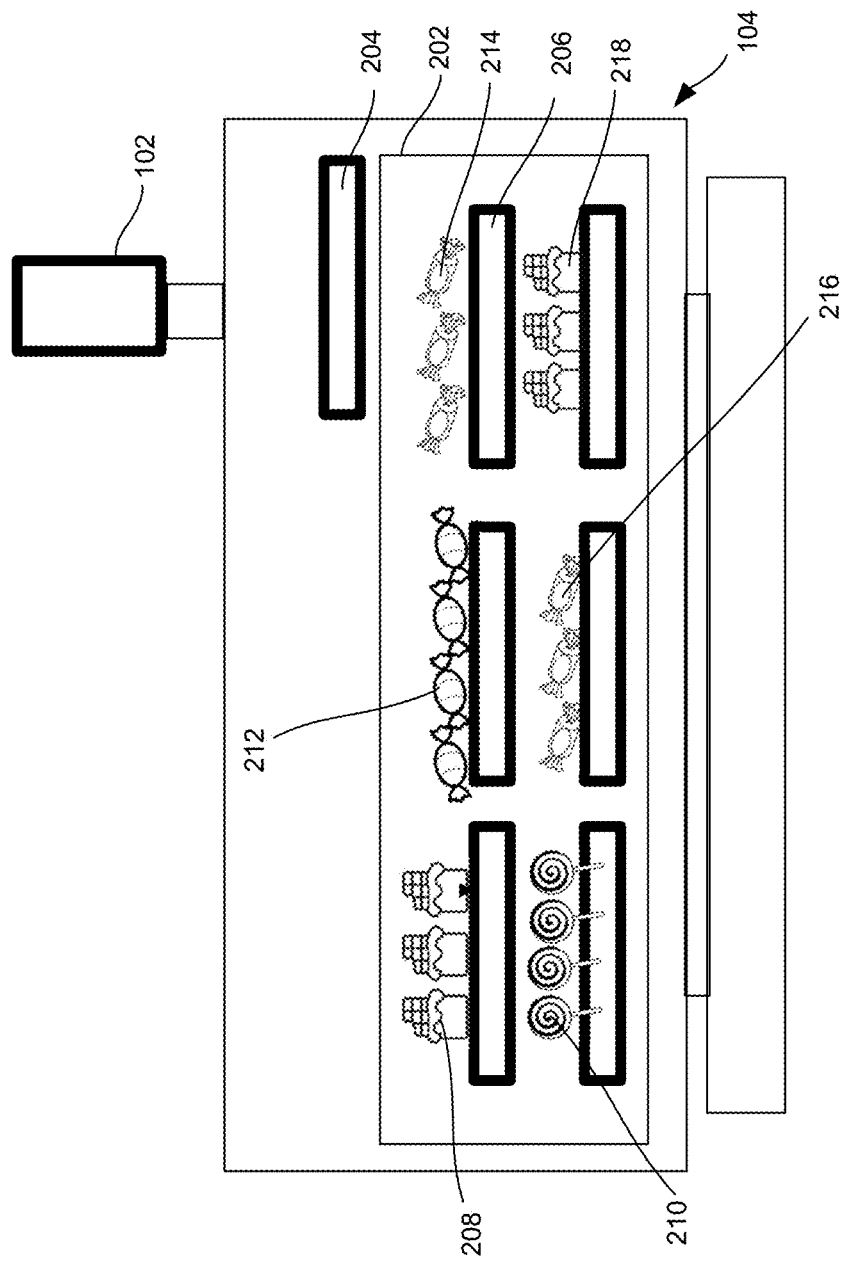

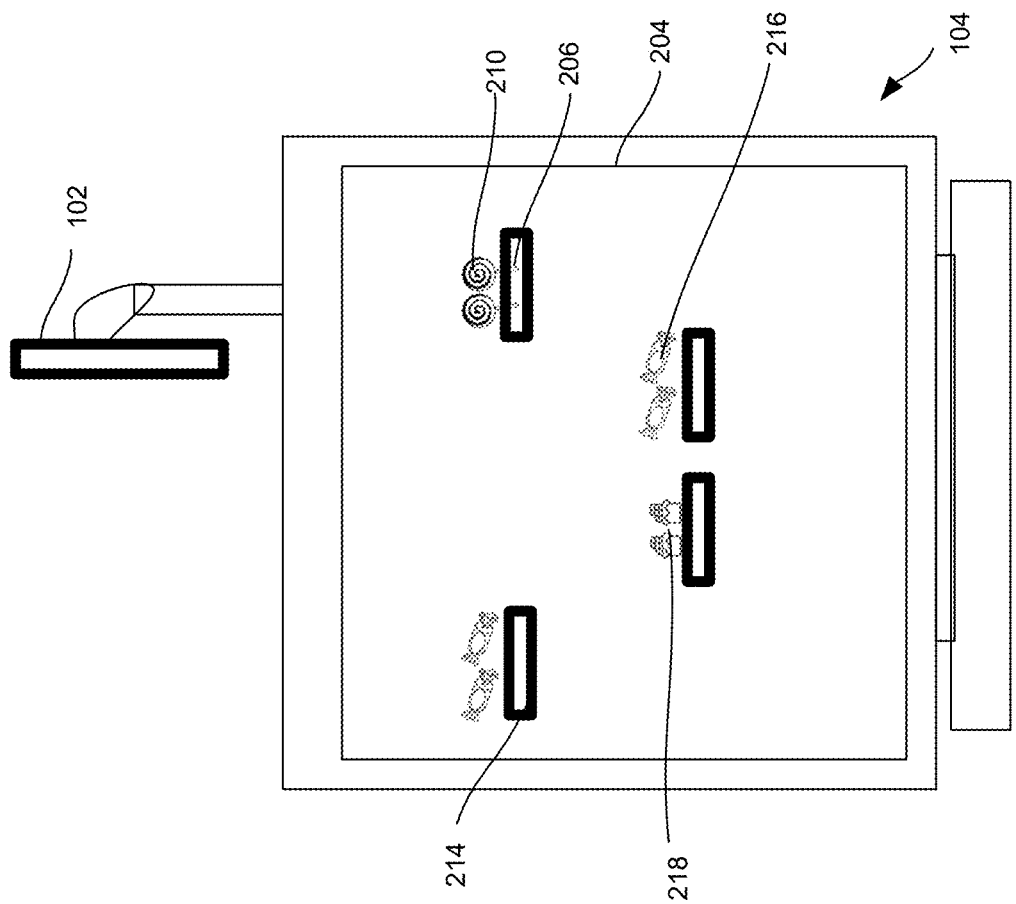

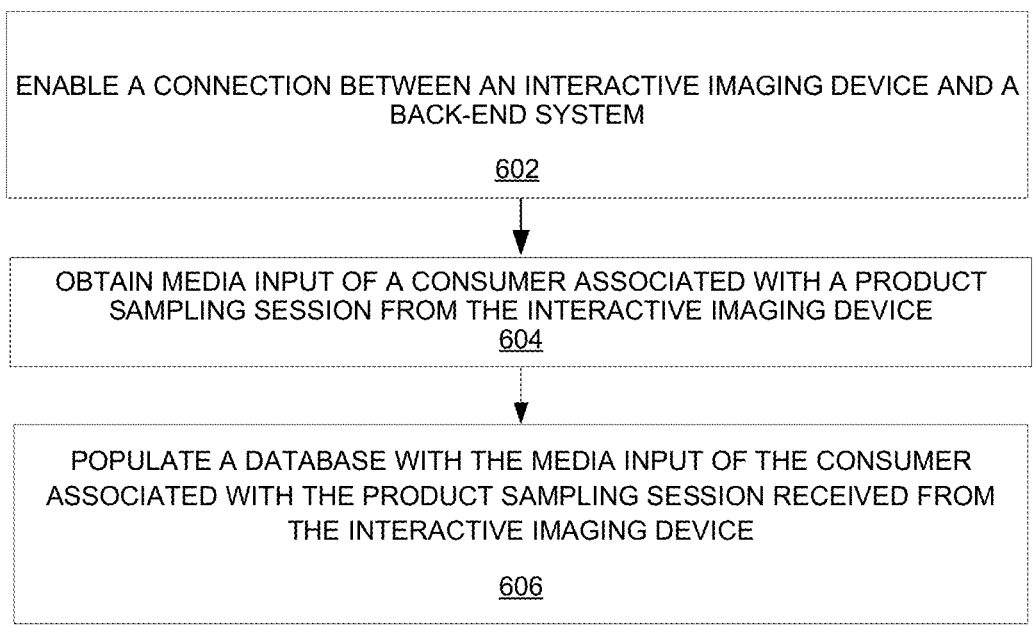
FIG. 6

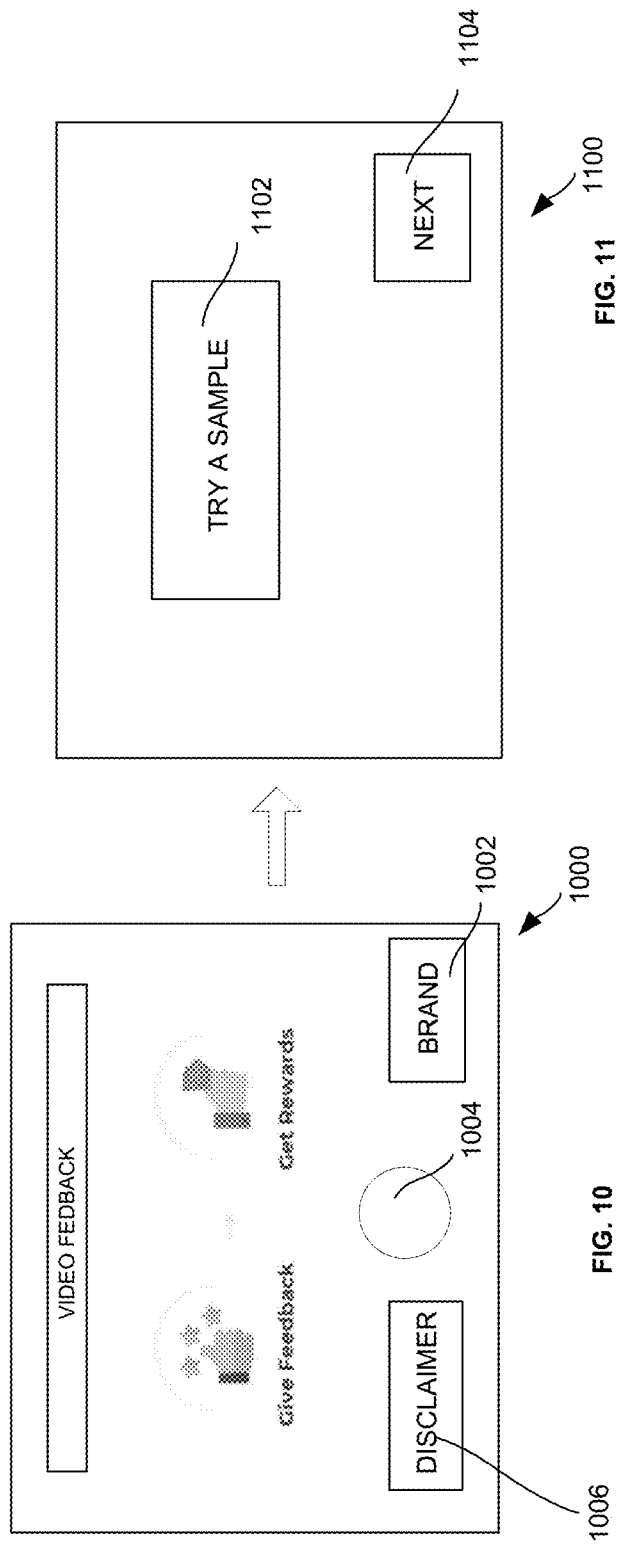

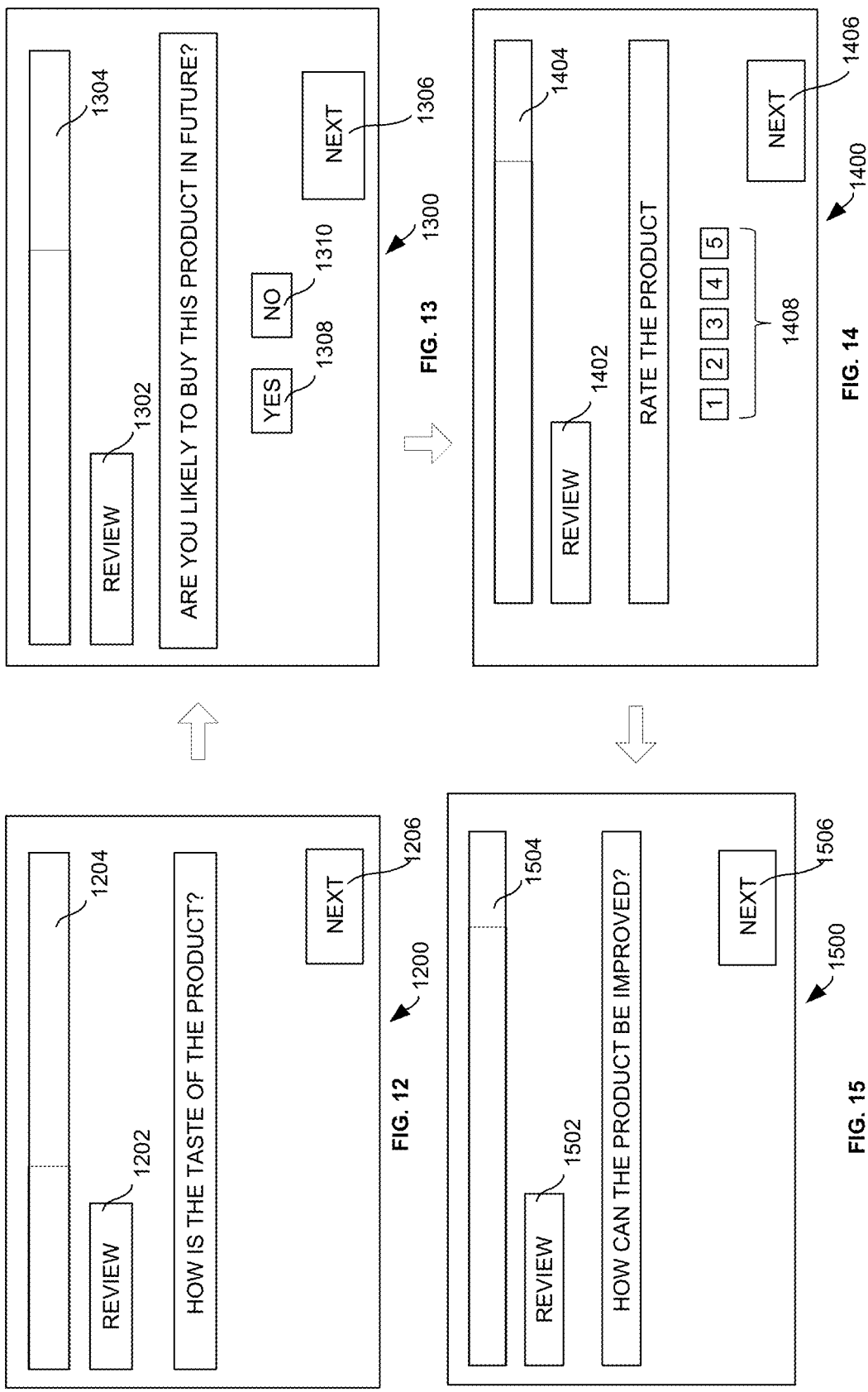

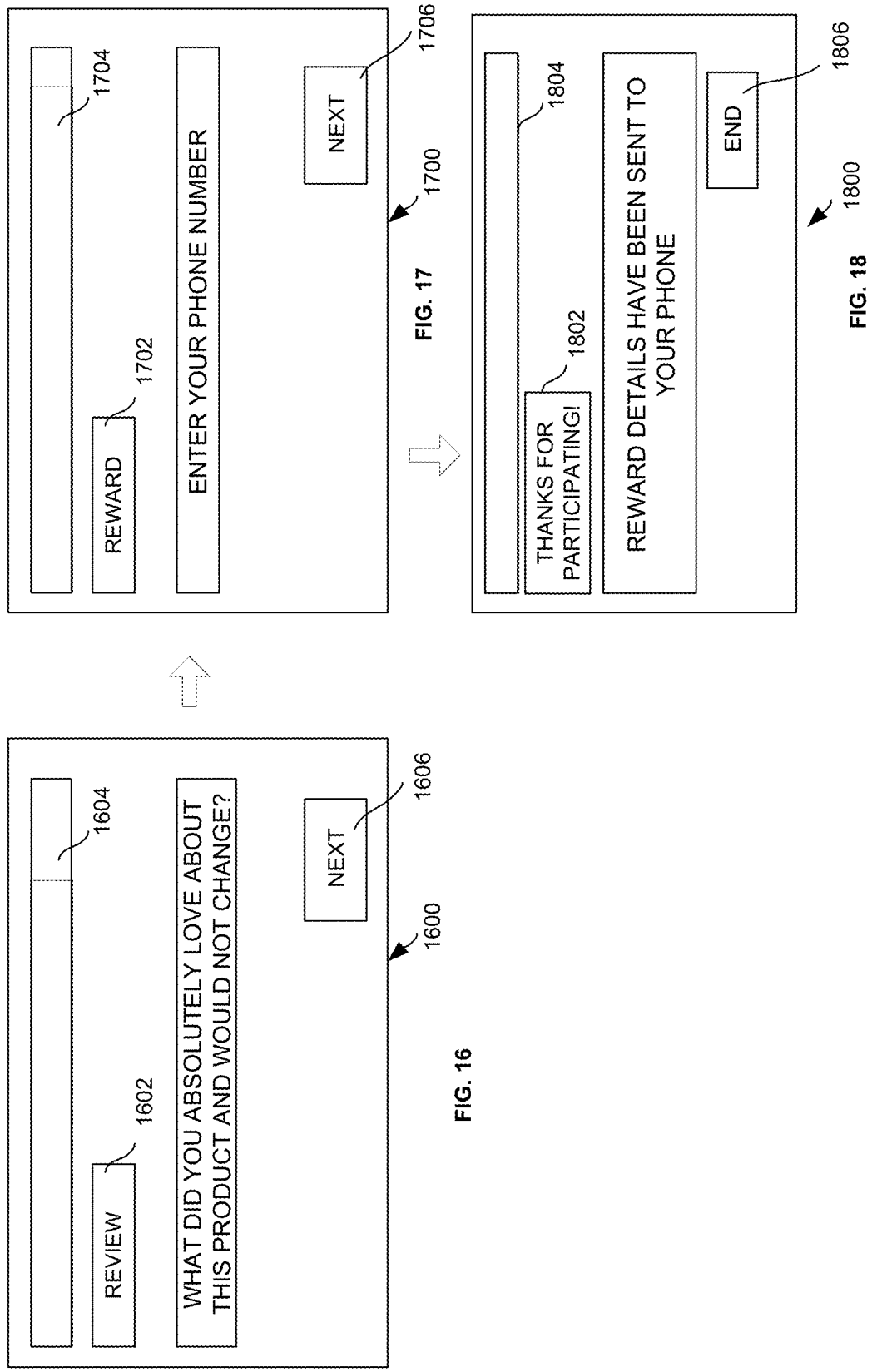

COLLECTION OF CONSUMER FEEDBACK ON DISPENSED PRODUCT SAMPLES TO GENERATE MACHINE LEARNING INFERENCES

RELATED APPLICATION

This disclosure claims priority to U.S. provisional patent application Ser. No. 62/959,864, entitled "Collection Of Consumer Feedback On Dispensed Product Samples To Generate Machine Learning Inferences," and filed on Jan. 10, 2020, entire contents of which are incorporated herein by reference.

TECHNICAL FIELD

This disclosure relates to dispensing product samples to consumers, obtaining real-time feedback regarding the product samples from those consumers, and generating real-time machine learning inferences specific to corresponding product samples based on such feedback.

BACKGROUND

Brand manufacturers and brand developers seek opportunities to engage consumers to personally experience their products and to understand their affinity towards their products. Consumers often show reluctance to buy a new product and their purchases greatly depend on the familiarity of the product. Hence, brand manufacturers and brand developers distribute free samples through various traditional distribution channels including magazines, retail store promotions, emails, and free give away events and obtain consumers feedback about the product. The manufacturers, however, face problems with obtaining qualitative feedback about their product. For instance the consumers may not follow through with sharing their experience in detail.

One way to capture feedback accurately is to have a human interviewer give out a product sample. However, practically it would be too expensive to have human interviewers engage with each consumer. Feedback can be captured by prompting a consumer to answer, e.g., on a computer, open-ended or close-ended questions, although this type of feedback is rarely as detailed or rich as the feedback that can be obtained by a live interviewer.

SUMMARY

Existing automated product distribution system are not interactive or engaging, and do not capture the consumer's experience including their emotions. Also, the existing systems and methods are not capable of providing deeper qualitative insights through analysis of the obtained feedback. Therefore, in view of the foregoing, there is an unmet need for an automated interactive product sample distribution system that obtains real-time rich consumer feedback.

Implementations disclosed herein provide an interactive product sampling and insights generation system configured to distribute product samples to consumers, obtain real-time feedback (e.g. various expressions and reactions of each consumer consuming the sample products) from those consumers, and generate real-time insights (e.g., machine learning inferences) specific to corresponding product samples based on such feedback. Related methods, techniques, apparatuses, computer-program products, machine-readable media, and systems are also discussed herein.

In one aspect, a system is described that includes a sampling subsystem, an interactive imaging device, and a server. The sampling subsystem can distribute one or more samples of a product to a consumer. The interactive imaging device can be communicatively coupled to the sampling subsystem to receive feedback from the consumer while the consumer engages with the product. The server can be communicatively coupled to the interactive imaging device to generate real-time insights specific to the product based on the feedback.

In some implementations, one or more of the following can be additionally implemented in any feasible combination. The sampling subsystem can include: one or more product holding receptacles to hold the one or more samples of the product; a movable component to retrieve the one or more samples from the one or more product sample holding receptacles; and a vending unit to dispense the one or more samples to the consumer. The movable component can include a robotic arm configured to move the one or more samples from the one or more product holding receptacles to the vending unit. In some examples, the movable component can include a conveyer belt configured to transport the one or more samples from the one or more product holding receptacles to the vending unit. The feedback can include at least one of textual input, audio input, or visual input.

The server can include: an interaction module is configured to receive, from the interactive imaging device, a media input comprising the feedback; and an analytics module that implements a machine learning model to analyze the media input to generate the real-time insights. The media input can further include a video of the consumer engaging with the one or more samples of the product. The feedback can be obtained in response to tasks or questions displayed on the interactive imaging device. The tasks or questions can be superimposed on—or placed adjacent to (e.g. above, below, or on the side of)—the video of the consumer engaging with the one or more samples of the product. The interaction module can be configured to receive the media input from an interactive graphical user interface of the interactive imaging device. The graphical user interface can be configured to: sequentially display a plurality of questions; receive a plurality of responses to the plurality of questions from a consumer of the plurality of consumers; and display progress indicating a portion of the plurality of responses that have been answered by the consumer. The generating of the real-time insights can include: automatically transcribing data within the media input; identifying at least one of keywords or topics from the transcribed data, wherein the identifying comprises performing sentimental and emotional analysis on the transcribed data to generate the at least one of keywords or topics; and generating the real-time insights based on the at least one of keywords or topics. The server can further include a presentation module configured to transmit the real-time insights to a computing device for presentation of the real-time insights on the computing device.

Related methods, non-transitory computer program products, apparatuses, and techniques are also described and within the scope of this disclosure.

The implementations described herein have several advantages. For example, the sampling system that dispenses product samples is a single integrated system with advanced computational capabilities and a unique mechanical design to effectively dispense samples. Such sampling system can advantageously display several types of product samples in a single location, thereby preventing a consumer from going to several different places to try different product samples. Moreover, such sampling system can include several hardware devices and software modules that are all integrated into a single unit and communicate effectively, thereby creating a single powerful device for providing product samples to consumers. Furthermore, such sampling system can be interactive, which can enhance consumer engagement with the system as well as product samples. The interactive graphical user interface of the sampling system is beneficially simplistic, easy to maneuver, and engaging, which encourages interaction between consumers and the system, thereby encouraging the consumers to try more product samples. Additionally, some implementations of the sample system use various dispensing mechanisms, such as technically effective conveyer belts, robotic systems (e.g., robotic arms), and/or the like, which can effectively dispense products. Moreover, such sampling system can advantageously enable companies providing products to obtain feedback regarding their products from a large number of and geographically widespread consumers, thereby helping scale their marketing efforts with a low cost.

Further, the insights generation system that generates real-time insights advantageously uses artificial intelligence and machine learning techniques to create useful and easy-to-understand metrics that can indicate marketing effectiveness of the products that are dispensed by the sampling system. Such metrics can advantageously enhance the effectiveness with which those companies market their products.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 3A illustrates a front view of a system including the sampling subsystem of FIGS. 1-2 and an interactive imagining device.

FIG. 3B illustrates a right-side view of the system of FIG. 3A.

FIG. 6 illustrates a flow diagram for an example process of populating a database with media input of a consumer.

FIG. 10 illustrates an example of a graphical user interface of the initiation module of FIG. 4.

FIG. 11 illustrates an example of another graphical user interface of the interaction module of FIG. 4.

FIG. 12 illustrates an example of another graphical user interface of the interaction module of FIG. 4.

FIG. 13 illustrates an example of another graphical user interface of the interaction module of FIG. 4.

FIG. 14 illustrates an example of another graphical user interface of the interaction module of FIG. 4.

FIG. 15 illustrates an example of another graphical user interface of the interaction module of FIG. 4.

FIG. 16 illustrates an example of another graphical user interface of the interaction module of FIG. 4.

FIG. 17 illustrates an example of another graphical user interface of the interaction module of FIG. 4.

FIG. 18 illustrates an example of another graphical user interface of the interaction module of FIG. 4.

Like reference numbers in various drawings indicate like elements.

DETAILED DESCRIPTION

Generally, an interactive product sampling and insights generation system is described that is configured to distribute product samples to consumers, obtain real-time feedback (e.g. various expressions and reactions of each consumer consuming the sample products) from those consumers, and generate real-time insights (e.g., machine learning inferences) specific to corresponding product samples based on such feedback.

Figure 1:
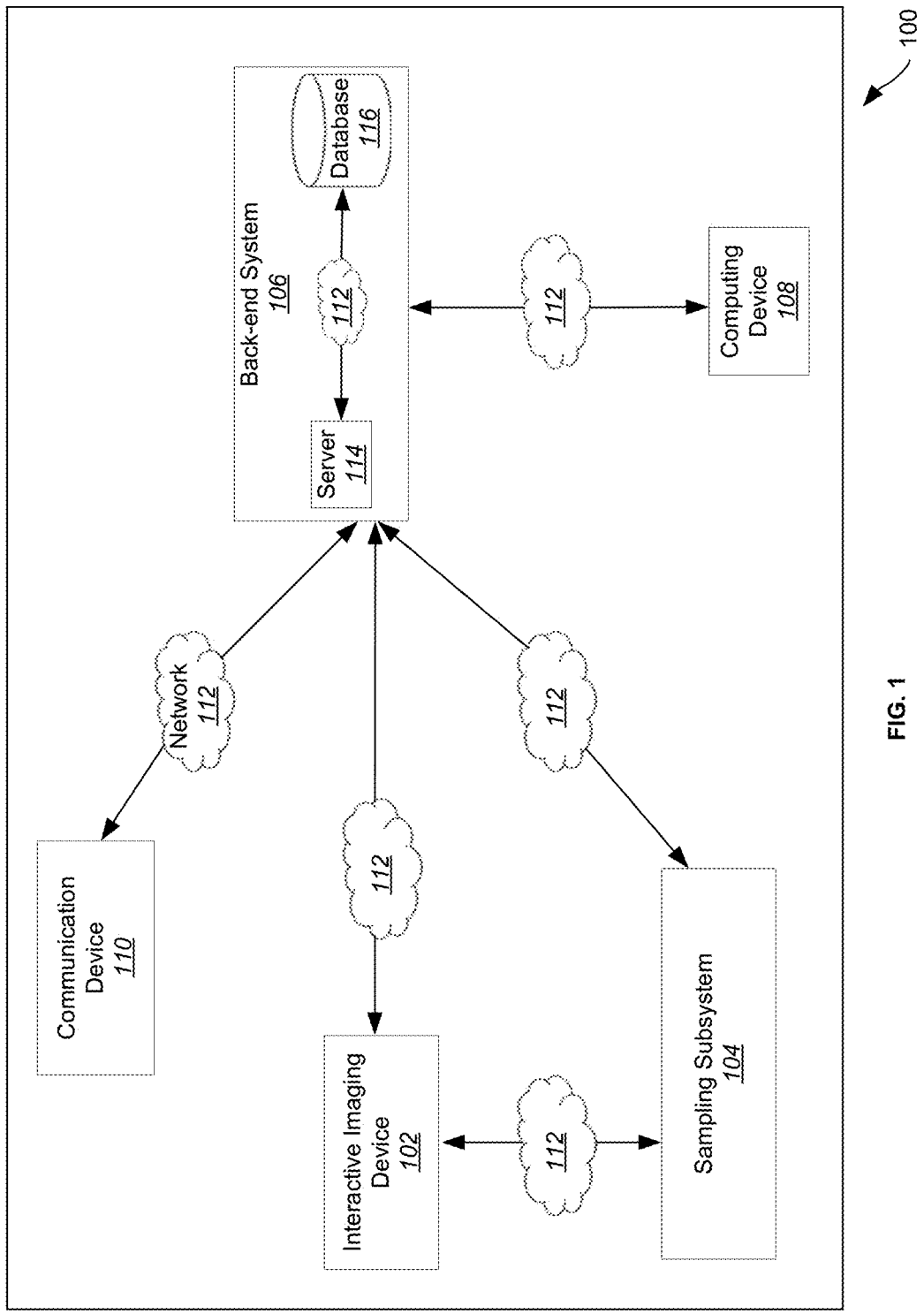
FIG. 1 illustrates a system view of an interactive product sampling and insights generation system, which includes a sampling subsystem.

FIG. 1 illustrates a system view of an interactive product sampling and insights generation system 100. The interactive product sampling and insights generation system 100 can be configured to be operated by a consumer. The interactive product sampling and insights generation system 100 includes an interactive imaging device 102, a sampling subsystem 104, a back-end system 106, a computing device 108, a communication device 110, a communication network 112, a server 114, and a database 116.

The sampling subsystem 104 can be a computing kiosk, a booth, a stand, a stall, a counter, and/or the like, which can dispense samples of products to a consumer. The interactive imaging device 102 can be a computer (e.g. a mobile phone, a kindle, a personal digital assistant, tablet, a computer, an electronic notebook, a smartphone, and/or the like) configured to physically or wirelessly connect with the sampling subsystem 102. The interactive imaging device 102 can display tasks or questions to the consumer, which the consumer can answer on the interactive imaging device 102 while experiencing or engaging with the product. The interactive imaging device 102 can record, for example, a video of the consumer answering the questions while experiencing the product sample. The interactive imaging device 102 can display the questions on a screen as the video of the consumer experiencing the product is being recorded. The back-end system 106 can receive the video, which includes the experience of the consumer along with responses provided by the consumer during such experience, and implement machine learning on the video to generate insights. The back-end system 106 can transmit the insights to the computing device 108 that can display the insights. The computing device 108 can be a computing device operated by a manufacturer, retailer, distributor, or marketer of the product for which insights have been generated. In some implementations, the back-end system 106 can use the insights to generate customized data (e.g. information to rent or purchase the product experienced, customized recommendations for related products, customized discounts on related products, or the like) for the consumer based on the responses provided by the consumer, and transmit that customized data to the communication device 110, which can be a computer (e.g. a mobile phone, a kindle, a personal digital assistant, tablet, a computer, an electronic notebook, a smartphone, and/or the like) of the consumer. In some implementations, the communication device 110 may be the interactive imaging device 102.

While the sampling subsystem 104 is described as dispensing product samples, in some implementations there may not be a sampling subsystem 104, and the consumer can be prompted, through the communication device 110, to use any product (e.g. product at any location, such as home of the consumer, retail store, factory, or any other location; e.g. product shipped to the consumer; etc.). Further, while many implementations are specific to products (e.g. obtaining consumer feedback while consumer experiences a product and then generating insights for that product), some implementations are specific to services and/or locations. For example, in some implementations, the consumer can be prompted, through an interactive imaging device 102 (e.g. interactive imaging device of a kiosk that may or may not dispense product samples) or the communication device 110, to experience any particular service (e.g. service at any location or establishment, such as a hotel, restaurant, retail store, sports facility, or the like) and can record responses to service-specific tasks or questions while the consumer experiences that service, and then insights can be generated using the video of the consumer experiencing the service and the responses provided by the consumer. Similarly, in a few implementations, the consumer can be prompted, through an interactive imaging device 102 (e.g. interactive imaging device of a kiosk that may or may not dispense product samples) the communication device 110, to experience any particular location (e.g. hotel, vacation rental, neighborhood, city, or the like) and can record responses to location-specific tasks or questions while the consumer experiences that location, and then insights can be generated using the video of the consumer experiencing the location and the responses provided by the consumer. While the implementations described here focus on consumer feedback on products, services or locations, in some implementations the techniques described herein can be extended to consumer feedback on any media file (e.g. text, video, audio, image, or the like), which can indicate a concept, package, advertisement, or the like. Additional details and/or variations are described below.

While the consumer feedback is described as being recorded while the consumer experiences the product, service, and/or location, in some implementations the consumer feedback can be recorded either (a) before (e.g. immediately before, such as 15 seconds before, 30 seconds before, 1 minute before, or the like) the consumer experiences the product, service, and/or location, or (b) after (e.g. immediately after, such as 15 seconds after, 30 seconds after, 1 minute after, 5 minutes after, or the like) the consumer experiences the product, service, and/or location. In some implementations, the consumer feedback can also referred to as a video survey.

The interactive imaging device 102 is communicatively connected to the sampling subsystem 104 and the back-end system 106 via the communication network 112. The sampling subsystem 104 is communicatively connected to the back-end system 106 via the communication network 112. The computing device 108 is communicatively connected to the back-end system 106 via the communication network 112. The communication device 110 is communicatively connected to the back-end system 106 via the communication network 112. The back-end system 106 includes a server 114 and a database 116. The server 114 and the database 116 are communicatively connected via the communication network 112.

The interactive product sampling and insights generation system 100 generates qualitative insights (e.g. machine learning inferences) using one or more textual, audio, and visual inputs provided by the consumers on the interactive imaging device 102. The interactive imaging device 102 can be a mobile phone, a kindle, a personal digital assistant (PDA), tablet, a computer, an electronic notebook or a smartphone.

In some implementations, the interactive product sampling and insights generation system 100 includes a memory and a processor. The interactive imaging device 102 captures a media input of the consumer. The interactive imaging device 102 can be any device capable of capturing textual, audio, or visual input from the consumer. In some implementations, the interactive imaging device 102 includes at least one of a smartphone, a computer, a 360-degree camera, or other audio-visual equipment. In some implementations, the interactive imaging device 102 is affixed on the sampling subsystem 104.

In some implementations, the communication network 112 can be a wired or a wireless network. In some implementations, the communication networks 112 shown in FIG. 1 can be different networks that facilitate communication between the components of the interactive product sampling and insights generation system 100.

In some implementations, the back-end system 106 sends a recommendation to the consumer on the communication device 110 via the communication network 112. The interactive product sampling and insights generation system 100 can generate and populate a database of media input associated with the consumer. In some implementations, the media input includes at least one of an image of the consumer, a video of the consumer, or an audio segment of the consumer.

The interactive product sampling and insights generation system 100 can be configured to recruit targeted consumer via the interactive imaging device 102. The interactive imaging device 102 includes a graphical user interface. The back-end system 106 can provide information and receive information from consumers through the user interface.

In some implementations, the user interface is a user interface of a mobile phone, a kindle, a personal digital assistant (PDA), a tablet, a computer, an electronic notebook, or a smartphone. In some implementations, the user interface includes other input devices configured to receive information from a consumer such as a keyboard, a keypad interface, a voice recognition response recorder, or any other appropriate mechanism for obtaining consumer responses. In some implementations, the user interface includes at least one of buttons, icons, or audio signals to operationally connect and communicate with the consumer.

The user interface of the interactive imaging device 102 can display buttons that allow consumers to navigate to sample the products in which they are interested in. The user interface can display a home screen showing the company name, logo, or slogan to show the consumer to which company the product samples belong. The user interface can display at least one record button. In some implementations, the record button is a large red button that specifies "tap to begin." When the record button is selected by the consumer, the interactive imaging device 102 starts recording the media input of the consumer.

The user interface of the interactive imaging device 102 can display a disclaimer button, which includes terms and conditions respective to the product sampling. The consumer can read the terms and conditions before sampling the products using the sampling subsystem 104. The user interface can display a "try a sample" button, which on selection by the consumer, causes the interactive product sampling and insights generation system 100 to dispense a product sample to the consumer. The interactive imaging device 102 then instructs the consumer to consume the product sample. As the consumer consumes the product sample in front of the interactive imaging device 102, data about how a consumer handles, eats, and/or uses the product sample can be obtained in real-time and the facial expressions and reactions of the consumer consuming the product sample can be captured by the interactive imaging device 102.

In some implementations, the brand/company representative (e.g. representative of the company providing the product sample) watches and interacts with the consumer while the consumer is experiencing (e.g. trying or engaging with) the product sample and the consumer can generate immediate feedback about the product sample.

The user interface of the interactive imaging device 102 can display a next button to proceed to a next stage after the completion of a current task (e.g. product sampling).

The user interface can display a review button, which when selected by the consumer, can display a few short open-ended or close-ended questions about the product sample that the consumer just tried or products related to the sample to receive feedback from the consumer (e.g., textual feedback). Each question can appear in succession and the consumer is allowed to answer each one by one.

In some implementations, the user interface of the interactive imaging device 102 prompts the consumer to provide oral feedback about the product sample. The user interface can prompt the consumer to press the next button after providing feedback or completing a task (e.g., product sampling).

The user interface can display an option to obtain personal information of the consumer including at least one of an email address, a mobile phone number, or an address. The consumer's personal information can be used to provide incentives to the consumer such as earned points, coupons, free samples, or rewards.

The user interface of the interactive imaging device 102 can display a reward button. The consumer can receive a notification that welcomes them to a rewards program. For example, the notification can be a text message or email or the notification can be text displayed by the user interface.

In some implementations, the user interface of the interactive imaging device 102 displays a product feedback terminal to obtain input corresponding to a product preference of the consumer. In some implementations, the product feedback terminal obtains consumer input with respect to a preferred product sample through an audio-visual interface.

In some implementations, the product feedback terminal is configured to present product information and elicit a response from the consumer. The consumer's audio and/or visual feedback information is used to generate meaningful insights with respect to consumer interests and preferences of various samples of the sampling subsystem 104. The user interface of the interactive imaging device 102 can display a progress bar at a top of the screen to show a status of a process (e.g., task) that the consumer is working on.

In some implementations, media input of the consumer is captured using a portable computing device that includes a camera. In some implementations, the portable computing device integrates the user interface of the interactive imaging device 102. In some implementations, the interactive imaging device 102 is a smartphone, a laptop computer, or a tablet.

The interactive product sampling and insights generation system 100 can be located in a place of business, such as a grocery store, a salon, or an eatery. The interactive product sampling and insights generation system 100 can be placed in one of many different locations in a place of business, depending on the product sample type. For instance, in a bar setting, the interactive product sampling and insights generation system 100 can be positioned on a counter where consumers order drinks. In a grocery store, the interactive product sampling and insights generation system 100 can be situated at the front of an aisle corresponding to the type of product sample. In some implementations, the interactive product sampling and insights generation system 100 can be located in a public or private space such as a landmark, a park, a stadium, a rest stop, a hotel, an airport, or a transport terminal.

Figure 2:
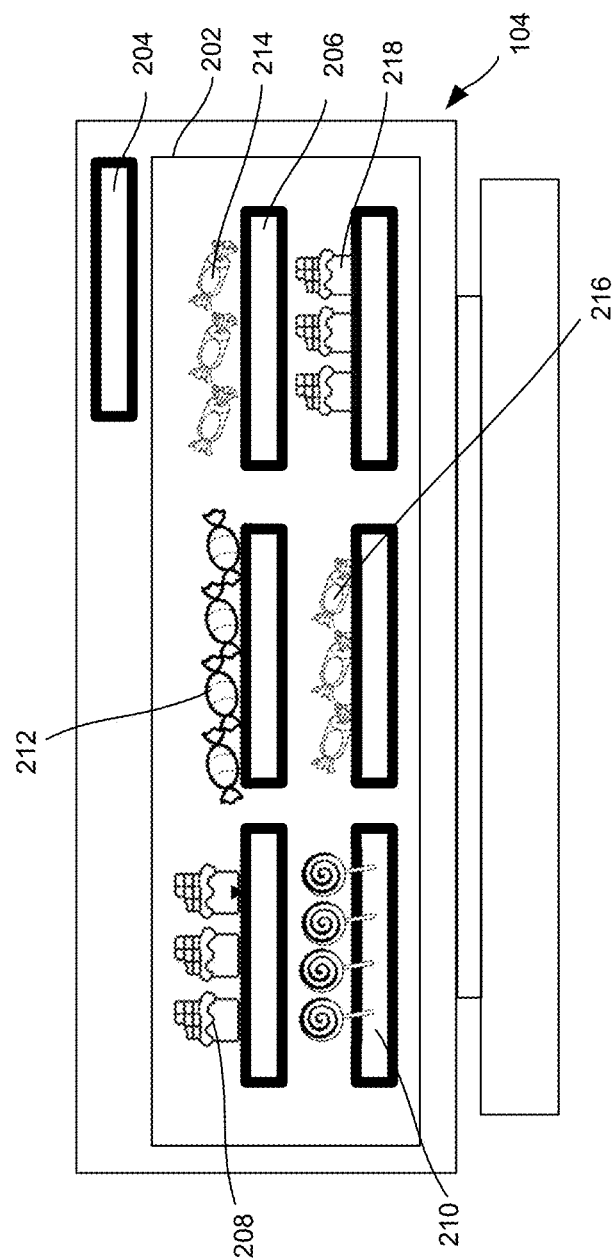
FIG. 2 illustrates an example of the sampling subsystem of FIG. 1.

FIG. 2 illustrates an example of the sampling subsystem 104 of the interactive product sampling and insights generation system of FIG. 1. The sampling subsystem 104 includes a housing 202, a vending unit 204, a product sample holding receptacle 206, and a moveable component 220 (not shown in FIG. 2).

One or more product samples are placed on one or more product sample holding receptacles 206, which are positioned inside the housing 202.

In the example of FIG. 2, the product samples placed on the product sample holding receptacles 206 include chocolate wafer cups 208, lollipops 210, caramel toffee 212, milk chocolate 214, dark chocolate 216, and vanilla wafer cups 218. The product samples of the sampling subsystem 104 can be any type of sample that can fit within the housing 202 and can depend upon a business type. For example, the product samples can be cold or hot drinks, canned goods, perishable foods, consumer package goods, beauty products, household goods, any other consumables, or the like.

In some implementations, the housing 202 is made of glass so that various product samples placed inside the housing 202 are visible to the consumers. A product sample can be dispensed through the vending unit 204 by a moveable component 220 that is configured to retrieve a product sample from the product sample holding receptacle 206. The movable component 220 can be controlled by an electronic control module that controls the movement of the moveable component.

An electronic control module, as used herein, can include specialized circuitry for generating signals or data. The signals or data can be used to control the movement of one or more moveable components of the interactive product sampling and insights generation system 100, e.g., the moveable component 220. In some implementations, the electronic control module includes a signal generator configured to produce AC waveforms of varying amplitudes, frequency, and/or pulse profiles suitable for controlling the movement of the movable component 220.

In some implementations, the electronic control module includes a processor such as a microprocessors, a central processing unit (CPU), an application-specific integrated circuit (ASIC), a digital signal processor (DSP), or combinations of such devices.

In some implementations, the electronic control module includes communication channels including one or more wireless interfaces that provide communications between the electronic control module and an external device. In general, the communication channels of the electronic control module can be configured to transmit and receive data and/or signals that can be interpreted by instructions executed by the electronic control module.

In some cases, the external device is part of an external communication network that is configured to exchange data with other devices. Generally, the wireless interface can include, without limitation, radio frequency, optical, acoustic, and/or magnetic signals and can be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, the moveable component 220 includes a robotic arm that is configured to move the product sample from the product sample holding receptacle 206 to be dispensed by the vending unit 204. The robotic arm can include a telescopic extender and can move—in 3-dimensions to reach a product sample placed on the product sample holding receptacle 206 in the housing 202. In some implementations, the movable component 220 or an electronic control module is configured to move the product sample holding receptacle 206 to facilitate the robotic arm to pick a product sample and dispense it through the vending unit 204.

In some implementations, the movable component 220 includes a conveyer belt to transport a product sample placed on the product sample holding receptacle 206 and dispense it through the vending unit 204. In some implementations, the housing 202 includes multiples rows of product sample holding receptacles 206 that hold the product sample to be dispensed. In some implementations, the quantity of one or more types of product samples in the housing 202 is tracked using one or more sensors arranged in one or more locations within the housing. Information related to the quantity of each type of product sample in the housing 202 can be communicated, via the communication network 112, from the sampling subsystem 104 to the computing device 108 or any other computer located in the location/establishment (e.g. computer configured to be operated by a personnel of a retail store where the product sample is located).

In some implementations, a notification is generated when the quantity of a product sample in the housing 202 is below a threshold value and the notification, which can include the quantity of the product sample, is communicated by the sampling subsystem 104 via the communication network 112 to the computing device 108 or any computer located in the location/establishment (e.g. computer configured to be operated by a personnel of a retail store where the product sample is located). In some implementations, the computing device 108 is accessed by at least one of brand representatives, manufacturers, personnel associated with brand merchandise, or personnel associated with sample analytics.

FIG. 3A illustrates a front view of the sampling subsystem 104 and the interactive imaging device 102. The sampling subsystem 104 includes the housing 202, the vending unit 204, and the product sample holding receptacle 206. One or more product samples are placed on one or more product sample holding receptacles 206, which are located inside the housing 202. The interactive imaging device 102 is securely affixed on the sampling subsystem 104. In some implementations, the interactive imaging device 102 is adjustably positioned on the sampling subsystem 104 at a desired angle and at a desired height to provide an optimal viewing position for the consumer.

FIG. 3B illustrates a right-side view of the sampling subsystem 104 and the interactive imaging device 102. The right side view of the sampling subsystem 104 includes the housing 202 and the product sample holding receptacle 206.

Figure 4:
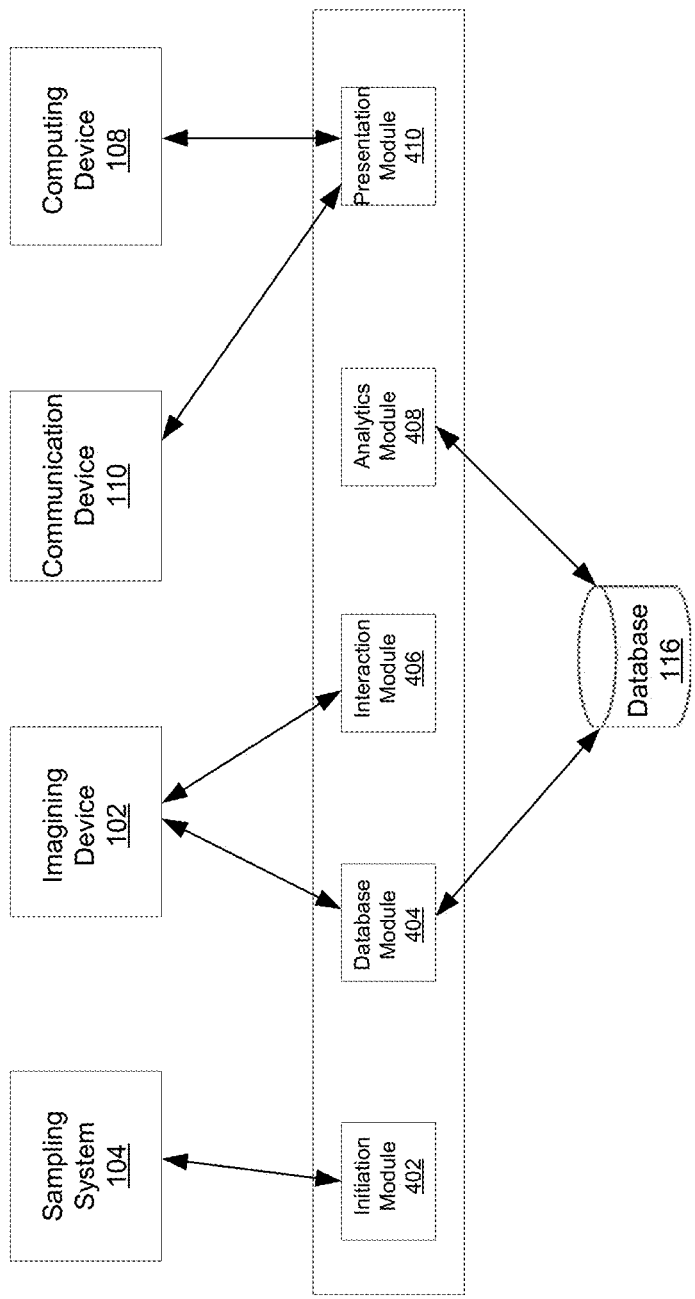
FIG. 4 illustrates a block diagram of the interactive product sampling and insights generation system of FIG. 1, which includes a server including an initiation module and an interaction module.

FIG. 4 illustrates a block diagram of the interactive product sampling and insights generation system 100, which includes a server including an initiation module 402 and an interaction module 406. The interactive product sampling and insights generation system 100 includes the interactive imaging device 102, the sampling subsystem 104, the back-end system 106, the computing device 108, the communication device 110, and the database 116.

The back-end system 106 includes the server 114 which includes the initiation module 402, a database module 404, the interaction module 406, an analytics module 408, and a presentation module 410. The server 114 implements the above modules to receive, process, and analyses the consumer feedback to present the insights.

A module as used herein can include software instructions and codes to perform a designated task/function. The modules of FIG. 4 are grouped according to the functions that they perform. A module as used herein can be a software module or a hardware module. A software module can be a part of a computer program, which can include multiple independently developed modules that can be combined or linked via a linking module. A software module can include one or more software routines. A software routine is computer readable code that performs a corresponding procedure or function.

A hardware module can be a self-contained component with an independent circuitry that can perform various computations used in machine learning computations described herein. The initiation module 402 is configured to obtain a media input comprising a real time feedback provided by a consumer about a product sample that they sampled. The media input can be obtained from the interactive imaging device 102 through a graphical user interface.

In some implementation, the server 114 is communicatively connected to the interactive imaging device 102 for obtaining the media input comprising feedback provided by the consumer. The database module 404 can generate and populate the database 116 with the media input associated with the consumer. The media input can be captured using the interactive imaging device 102. The media input can include at least one of an image of the consumer, a video of the consumer, or an audio segment of the consumer each captured while the consumer was sampling a product sample.

The interaction module 406 can interact with the consumer who is sampling a product and obtain video or audio feedback (e.g. media input that includes video or audio input obtained in real-time or near real-time) about the product. In some implementations, the interaction module 406 obtains a textual feedback from the consumer. The interaction module 406 communicates the media input, including video or audio feedback, or the textual feedback provided by the consumer.

The interaction module 406 is communicatively connected to the analytics module 408. The analytics module 408 is configured to receive the media input and/or the textual feedback from the interaction module 406 and analyze the media input and/or the textual feedback obtained from the consumer by employing a machine learning model. The machine learning model as used herein is an artificial neural network model. Although a neural network model is described, in some implementations the machine learning model can be a decision tree, a support vector machine, a regression analysis, a Bayesian network, a genetic algorithm, any other machine learning model, and/or any combination thereof. In some implementations, at least some computations of the machine learning model can be performed on a hardware accelerator communicatively coupled to one or more processors (of the interactive product sampling and insights generation system 100) that perform other computations of the machine learning. The machine learning model generates qualitative insights by performing at least one of (i) automatic audio transcription of the audio of the consumer from the media input, (ii) generation of keyword and topic from the transcribed audio and the textual feedback obtained from the consumer, (iii) keyword/brand spotting on the transcribed audio and the textual feedback of the consumer, (iv) perform sentimental and emotional analysis on transcribed audio and the video associated with the media input and the textual feedback provided by the consumer, and (v) generate the insights based on the audio transcription, generated keywords and/or topics, spotted keyword/brands and the sentimental and emotional analysis. The use of the hardware accelerator can be advantageous because the modules of the back-end system 106 that perform machine learning can offload certain computing tasks onto specialized hardware components, which can enable greater efficiency (e.g. higher computation speed and reduced latency) than possible in only software performing such machine learning by using a general-purpose central processing unit (CPU) alone. While transcribing or transcription of data is described herein, in some implementations the data can be alternately or additionally be automatically translated from one language to another.

The analytics module 408 is communicatively connected to the presentation module 410. The presentation module 410 can present the insights/analytics as deliverables on the computing device 108. In some implementations, the analytics module 408 performs audio transcription of the audio feedback of the consumer using natural language processing techniques. The analytics module 408 can perform keyword and topic generation from the transcribed audio and/or the textual feedback of the consumer using the machine learning model. The analytics module 408 can perform keyword/brand spotting from the transcribed audio and the textual feedback of the consumer using the machine learning model. The analytics module 408 can perform emotional and sentimental analysis on the keywords, brands, and topics, e.g., using the machine learning model generated keywords, brands, and topics, to generate emotional and sentimental scores.

The analytics module 408 can perform various types of analysis to generate analytics or insights. For example, the analytics module 408 can transcribe audio associated with the media input of the consumer to at least one of text or speech that can be further processed or directly used to generate insights or analytics. In some implementations, the analytics module 408 can recognize (i.e. detect) objects or scenes within a video forming the media input to generate insights or analytics generated from the video.

In some implementations, the analytics module 408 performs sentimental and emotional analysis on the video of the media input. In certain examples, the analytics module 408 generates emotional and sentimental scores based on the emotional and sentimental analysis performed on the generated keywords, brands, and topics and the video of the media input.

The analytics module 408 can include a trained model to determine facial expressions of the consumer on the video of the media input to generate the insights/analytics. For example, the model can be trained using images each labeled with a single emotion category including anger, disgust, fear, happiness, sadness, surprise, and neutral to generate a trained model capable of assigning emotion categories to newly provided image examples.

The analytics module 408 links the audio and/or video of the media input with the keywords, brands, and topics generated to generate the insights or analytics.

The presentation module 410 can present the insights after analysis by the analytics module 408 as deliverables in at least one of bar diagrams, pie charts, or other visual representations on the computing device 108. In some implementations, the presentation module 410 can present recommendations to the consumer based on the analysis on the communication device 110.

The server 114 can be communicatively connected to the communication device 110 and the computing device 108. In some implementations, the presentation module 410 presents the audio and/or video of the media input linked with the keyword, brands, and topics generated to the user (e.g. manufacturer, retailer, distributor, or marketer of the product) on the computing device 108. The presentation module 410 can permit the user to create a clip of the media (e.g. video and/or audio) on the computing device 108. In some implementations, the presentation module 410 can automatically generate media clips (e.g. video or audio) based on (a) consumer response to any task or question, (b) any keyword mentioned by the consumer, or (c) any object or scene present in the media file (e.g. when the media file includes a video or an image). The presentation module 410 can present the video object or scene based on comparison with the machine learning model generated video object or scene to the user on the computing device 108. The presentation module 410 can facilitate annotation and tagging of a particular video by the user and save for further research. The presentation module 410 can present a transcript of the responses of a consumer for queries in a tabular format to the user on the computing device 108. The presentation module 410 can present a video of the media input along with the corresponding audio transcript for a particular query to the user on the computing device 108. The presentation module 410 can facilitate a user to create themes and store the video clips corresponding to the created theme. The presentation module 410 can facilitate a user to combine the video clips corresponding to a particular theme and generate a report on the computing device 108.

In some implementations, the server 114 is a cloud computing server that stores information associated with the sampling subsystem 104. In some implementations, the server 114 manages the inventory and sample product information associated with the sampling subsystem 104.

The database 116 can store consumer related information including at least one of videos, personal details, or consumer preferences related to the product samples.

In some implementations, one or more of the initiation module 402, the database module 404, the interaction module 406, the analytics module 408, and the presentation module 410 can be grouped into a single software module to perform the above functions.

In some implementations, the modules 402-410 are selectively grouped to perform a customized task (e.g. providing a review on the experience of the product sample or a service or location) depending upon a business type.

In some implementations, the interaction module 406 is configured to acquire the consumer's experience of a product sample or a service or a location (e.g. in a video feedback kiosk in a hotel). For example, when implemented in a hotel the interaction module 406 of the interactive product sampling and insights generation system 100, can acquire a feedback from the consumer through the interactive imaging device 102. The media input associated with the consumer who is providing the feedback can be recorded. The interaction module 406 can display a few short open-ended or close-ended questions about the service provided by the hotel to obtain textual feedback from the consumer.

The analytics module 408 can analyze the media input and the textual feedback from the consumer by employing Artificial Intelligence capabilities (e.g. a machine learning model) to generate qualitative insights by performing at least one of (i) automatic audio transcription of the media input, (ii) generation of keyword and topic from the audio transcription and the textual feedback provided by the consumer, (iii) sentimental and emotional analysis of keywords and topics that are generated by the machine learning model. The presentation module 410 can present the insights/analytics as deliverables on the computing device 108. In some implementations, the insights include generated sentimental and emotional scores based on the sentimental and emotional analysis.

Figure 5:
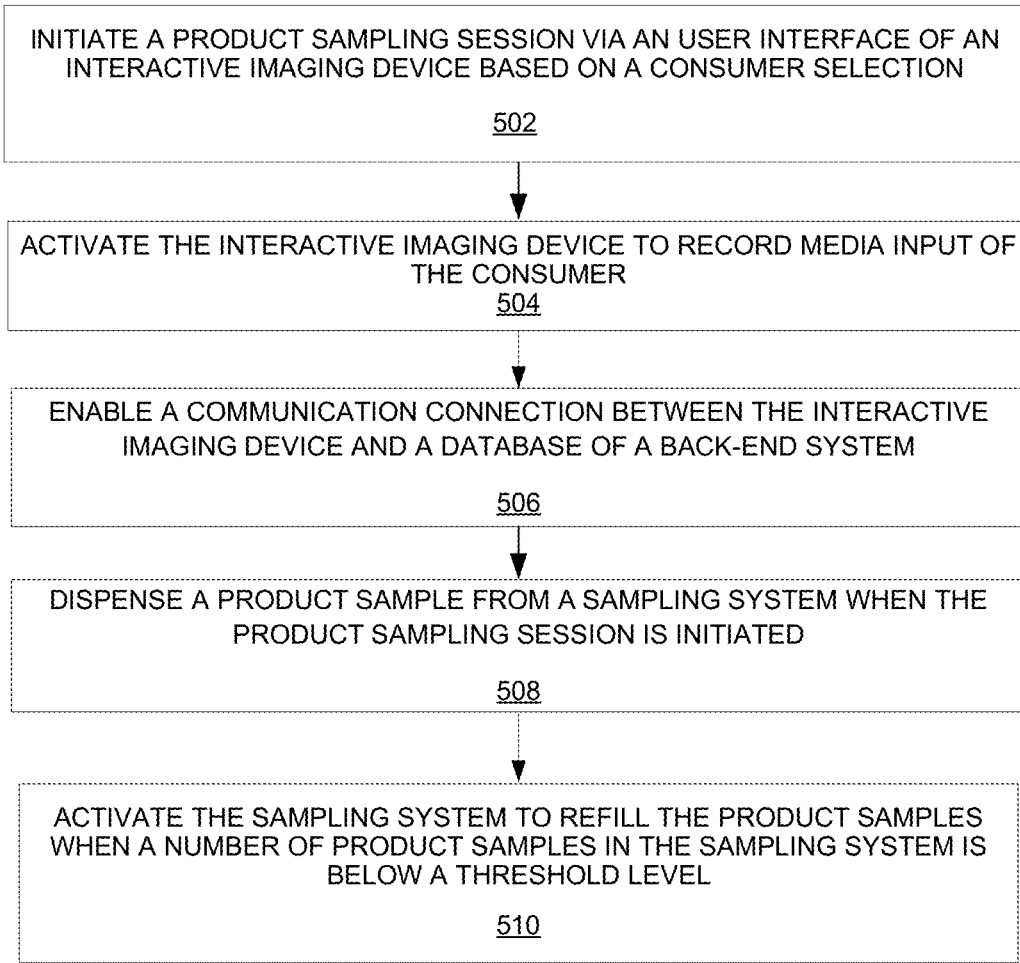
FIG. 5 illustrates a flow diagram for an example process of refilling product samples.

FIG. 5 illustrates a flow diagram 500 for an example process of refilling product samples. The example process will be described as being performed by a system of one or more computers programmed in accordance with this specification. For example, the interactive product sampling and insights generation system 100 that includes the initiation module 402 can perform the example process. In some implementations, the initiation module 402 performs the sample process of FIG. 5.

The system can initiate, at 502, a product sampling session through a user interface of an interactive imaging device 102 based on a selection made by a consumer.

The system can activate, at 504, the interactive imaging device 102 to record media input of the consumer.

The system can enable, at 506, a communication connection via a communication network 112 between the interactive imaging device 102 and a back-end system 106.

The system can activate, at 508, a sampling subsystem 104 to dispense a product sample.

The initiation module 402 can activate, at 510, the sampling subsystem to refill the product samples when a number of product samples in the sampling subsystem 104 is below a threshold level. The sampling session data (e.g. media input) can be stored in the database 116. The media input of the consumer can include at least one of textual, audio, or visual feedback from the consumer.

FIG. 6 illustrates a flow diagram 600 for an example process of populating a database with media input of a consumer. The example process will be described as being performed by a system of one or more computers programmed in accordance with this specification. For example, the interactive product sampling and insights generation system 100 that includes the database module 404 can perform the example process. In some implementations, the database module 404 performs the example process of FIG. 6.

The system can initiate, at 602, a communication connection between an interactive imaging device 102 and a back-end system 106.

The system can obtain, at 604, media input of a consumer associated with a product sampling session from the interactive imaging device 102.

The system can populate, at 606, a database with the media input of the consumer associated with the product sampling session from the interactive imaging device 102. In some implementations, prior to populating the database 116, the system can generate the database 116 according to the types of media input obtained. In some implementations, the media input of the consumer includes at least one of textual, audio, or visual feedback.

Figure 7:
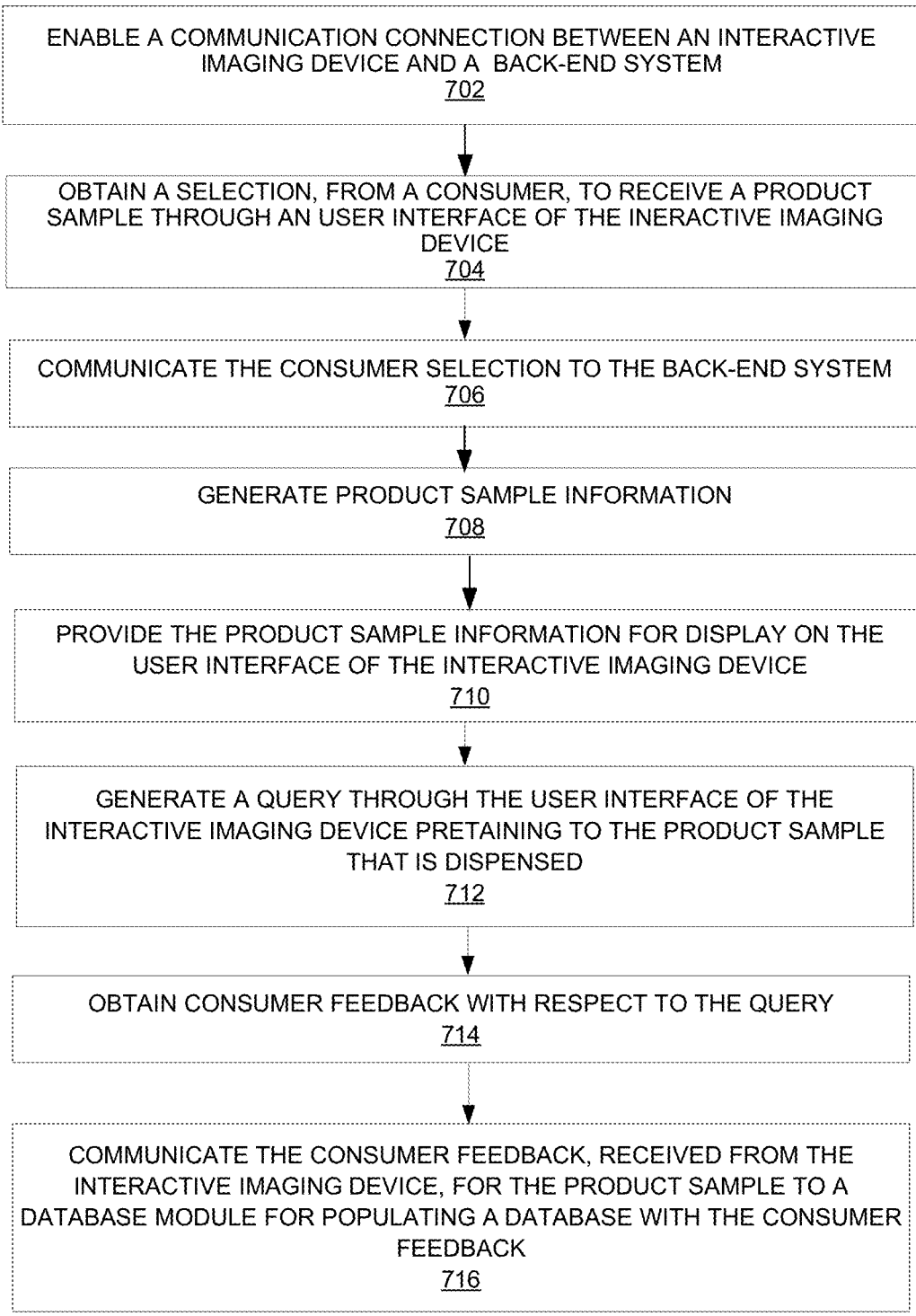
FIG. 7 illustrates a flow diagram for an example process of communicating consumer feedback to a database module.

FIG. 7 illustrates a flow diagram 700 for an example process of communicating consumer feedback to a database module. The example process can be performed by a system of one or more computers programmed in accordance with this specification. For example, the interactive product sampling and insights generation system 100 that includes the database module 404 and the interaction module 406 can perform the example process. In some implementations, the interaction module 406 performs the example process of FIG. 7.

The system can enable, at 702, a communication connection between an interactive imaging device 102 and a back-end system 106.

The system can obtain, at 704, a selection, from a consumer, to receive a product sample through a user interface of the interactive imaging device 102.

The system can communicate, at 706, the consumer selection to the back-end system 106 for dispensing a product sample.

The system can generate, at 708, product sample information for the selected product sample. For example, the product sample information can include one or more webpages and one or more images associated with the product sample.

The system can provide, at 710, the product sample information for display on the user interface of the interactive imaging device 102.

The system can generate, at 712, a query through the user interface pertaining to the product sample that is dispensed.

The system can obtain, at 714, consumer feedback with respect to the query.

The system can communicate, at 716, the consumer feedback for the product sample that is received from the interactive imaging device 102 to the database module to populate a database with the consumer feedback. In some implementations, prior to populating the database, the system can generate the database according to the types of feedback obtained. In some implementations, the consumer feedback includes at least one of textual, audio, or visual feedback.

Figure 8:
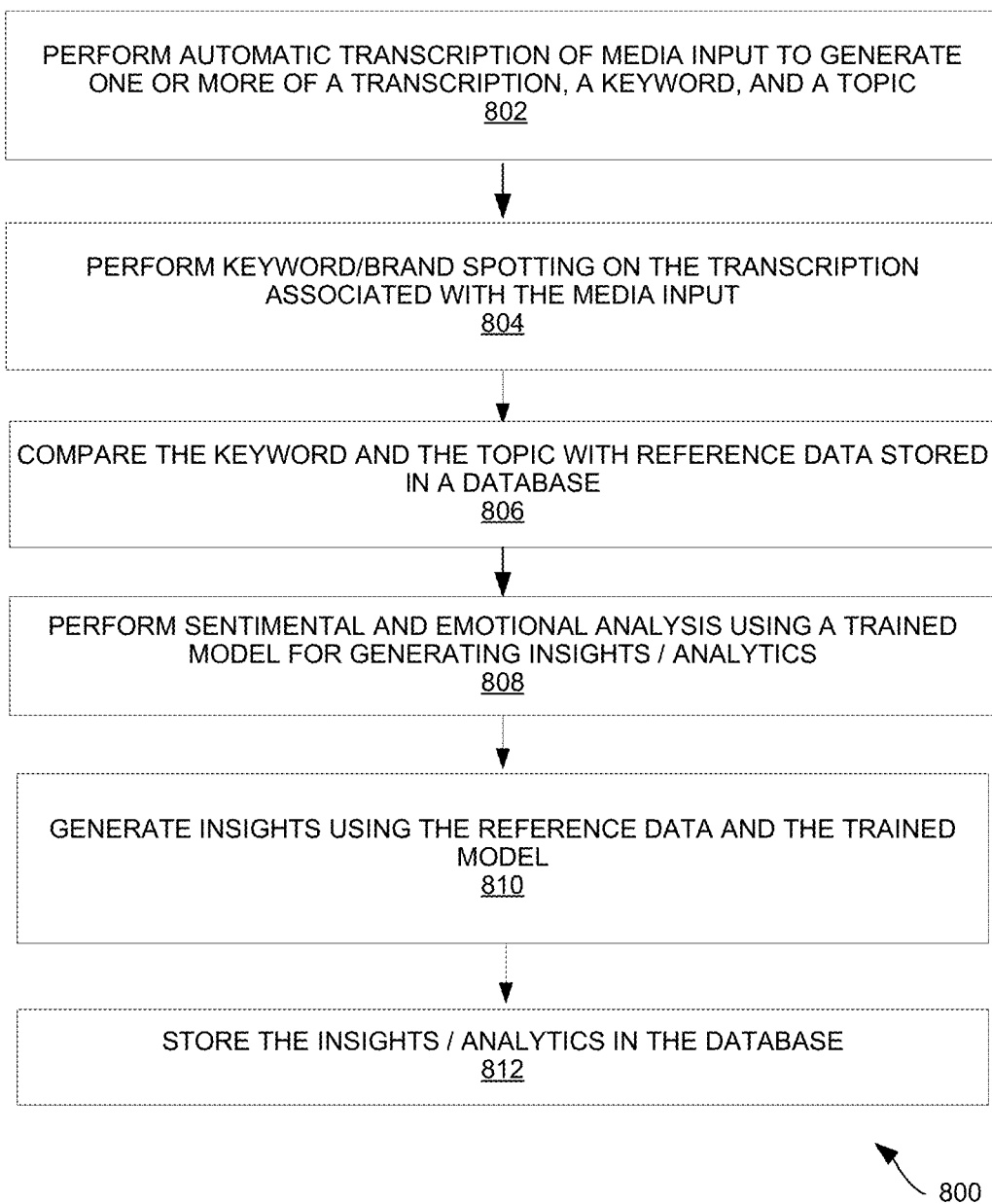
FIG. 8 illustrates a flow diagram for an example process of generating insights using reference data and a trained model.

FIG. 8 illustrates a flow diagram 800 for an example process of generating insights using reference data and a trained model. The example process will be described as being performed by a system of one or more computers programmed in accordance with this specification. For example, the interactive product sampling and insights generation system 100 that includes an analytics module 408 can perform the example process of FIG. 8. In some implementations, the analytics module 408 can perform the example process of FIG. 8.

The system can perform, at 802, automatic transcription of media input captured by an interactive imaging device 102 during a product sampling session to generate one or more of a transcription, a keyword, and a topic.

The system can perform, at 804, keyword/brand spotting on the transcription associated with the media input.

The system can compare, at 806, the keyword and the topic with reference data stored in a database.

The system can perform, at 808, sentimental and emotional analysis using a trained machine learning model for generating insights/analytics.

The system can generate, at 810, insights using the reference data and the trained model.

The system can store, at 812, the insights/analytics in the database. The media input can include at least one of textual, audio, or visual feedback of the consumer. In some implementations, the machine learning model can be trained using facial expressions.

Figure 9:
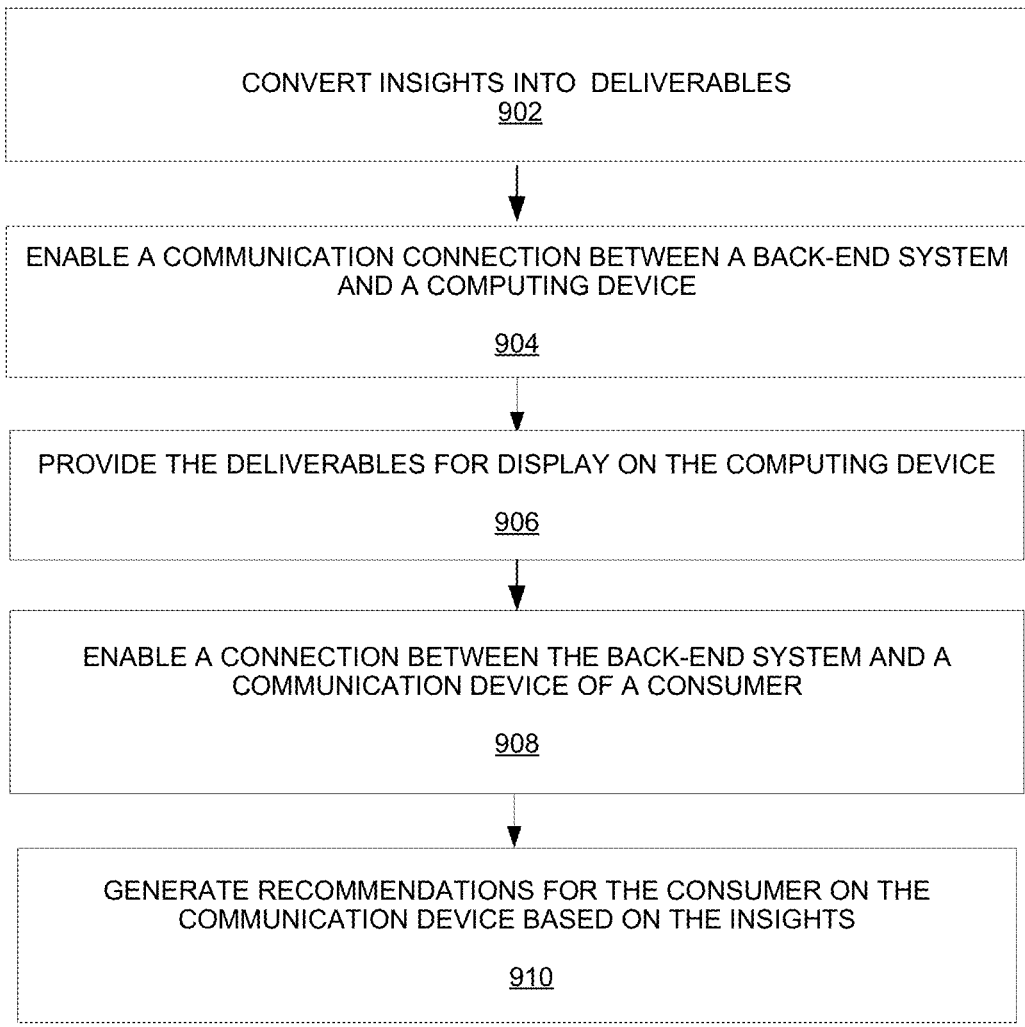
FIG. 9 illustrates a flow diagram for an example process of generating recommendations based on the insights of FIG. 8.

FIG. 9 illustrates a flow diagram for an example process of generating recommendations based on insights generated by the interactive product sampling and insights generation system 100. The example process will be described as being performed by a system of one or more computers programmed in accordance with this specification. For example, the interactive product sampling and insights generation system 100 that includes a presentation module 410 can perform the example process of FIG. 9. In some implementations, the analytics module 410 can perform the example process of FIG. 9.

The system can convert, at 902, insights into deliverables. In some implementations, the deliverables include least one of bar diagrams, pie charts or other visual representations.

The system can enable, at 904, a communication connection between a back-end system 106 and a computing device 108.

The system can provide, at 906, the deliverables for display on the computing device 108.

The system can enable, at 908, a communication connection between the back-end system 106 and a communication device 110 of a consumer.

The system can generate, at 910, recommendations for the consumer on the communication device 110 based on the insights.

FIG. 10 illustrates an example of a graphical user interface 1000 of the initiation module 402. The graphical user interface 1000 can present, for display, details with pictorial representations about the sampling subsystem 104 to recruit consumers to sample the product samples and to provide feedback upon sampling by the consumers. The graphical user interface 1000 includes a brand button 1002, a tap to begin button 1004 and a disclaimer button 1006.

The consumer can click on the brand button 1002 to prompt the interactive product sampling and insights generation system 100 to present for display on the user interface brand information pertaining to the product samples of the sampling subsystem 104. The consumer can click the tap to begin button 1004 to participate in the product sampling process. The consumer can click the disclaimer button 1006 to view the terms and conditions associated with the product sampling process.

In some implementations, the brand information includes a logo of one or more product samples or a trademark of one or more product samples. When the consumer taps the 'tap to begin' button 1004, the initiation module 402 can initiate the product sampling process. The initiation module 402 can activate the interactive imaging device 102 to record a video of the consumer.

FIG. 11 illustrates an example of a graphical user interface 1100 of the interaction module 406. The graphical user interface 1100 includes a try a sample button 1102, and a next button 1104. A consumer can click the try a sample button 1102 to sample a product of the sampling subsystem 104. That is, the sampling system 104 can dispense a product sample in response to the consumer clicking the try a sample button 1102.

In some implementations, visual display of product samples is provided at the interface to provide an option to the consumer to choose the desired sample if the product samples housed at the sampling subsystem 104 includes product variants. The consumer can click the next button 1104 to undertake a subsequent stage. The interaction module 406, upon obtaining selection from the consumer to try a sample, can activate the movable component 220 of the sampling subsystem 104 to dispense a product sample to the consumer through the vending slot 204. Upon completion of the current task, e.g., dispensing a product sample, the interaction module 406 can allow the consumer to navigate to another stage in the sampling process.

FIG. 12 illustrates an example of a graphical user interface 1200 of the interaction module 406. The graphical user interface 1200 includes a review button 1202, a progress bar 1204 and a next button 1206. A consumer can click the review button 1202 to provide feedback about the product sample that they have sampled. The interaction module 406 can provide the consumer with a status of the progress sampling process via a progress bar 1204 of the user interface 1200. The interaction module 406 can provide for display a question pertaining to the product upon receiving a selection from the consumer to review the sample. The interaction module 406 can present for display on the graphical user interface 1200 a question, for example "how is the taste of the product," to the consumer through the user interface 1200. The consumer can provide the feedback in oral or written form, or with facial gestures or expressions. In some implementations, the interaction module 406 receives textual feedback through the user interface 1200. The interaction module 406 presents for display on the graphical user interface 1200 the next button 1206 (e.g., after the interaction module receives feedback from the consumer) to allow the consumer to navigate to another stage in the sampling process.

FIG. 13 illustrates an example of a graphical user interface 1300 of the interaction module 406. The graphical user interface 1300 includes a review button 1302, a progress bar 1304, and a next button 1306. A consumer can click on the review button 1302 to receive a query relating to the sampled product. The interaction module 406 can present for display on the graphical user interface 1300 a query, for example "are you likely to buy this product in future?" The consumer can provide an answer to the query by selecting a yes button 1308 or a no button 1310. The interaction module 406 presents for display on the graphical user interface 1300 the next button 1306 (e.g., after receiving an answer to the query) to allow the consumer to navigate to another stage in the sampling process.

FIG. 14 illustrates an example of a graphical user interface 1400 of the interaction module 406. The graphical user interface 1400 includes a review button 1402, a progress bar 1404, and a next button 1406. The functions of these components as have been explained above. A consumer can click on the review button 1402 to receive a query relating to the sampled product. The interaction module 406 presents for display on the graphical user interface 1400 a prompt, for example "rate the product." The consumer can select a button corresponding to their rating, e.g., by selecting one of the buttons 1408 to rate the product on a scale from 1 to 5. The interaction module 406 presents for display on the graphical user interface 1400 the next button 1406 (e.g., after obtaining a rating from the consumer for the product) to allow the consumer to navigate to another stage in the sampling process.

FIG. 15 illustrates an example of a graphical user interface 1500 of the interaction module 406. The graphical user interface 1500 includes a review button 1502, a progress bar 1504, and a next button 1506. A consumer can click on the review button 1502 to receive a query relating to the sampled product. The interaction module 406 can present for display on the graphical user interface 1500 a question, for example "how can the product be improved?" In some implementations, the question can be presented as audio or video. The consumer can provide at least one of textual, oral, or video feedback. The interaction module 406 presents for display on the graphical user interface 1500 the next button 1506 (e.g., after obtaining feedback from the consumer) to allow the consumer to navigate to another stage in the sampling process.

FIG. 16 illustrates an example of a graphical user interface 1600 of the interaction module 406. The graphical user interface 1600 includes a review button 1602, a progress bar 1604, and a next button 1606. A consumer can click on the review button 1602 to receive a query relating to the sampled product. The interaction module 406 can present for display on the graphical user interface 1600 a query, for example "what did you absolutely love about this product and would not change?" The consumer can provide at least one of oral or textual feedback. The interaction module 406 presents for display on the graphical user interface 1600 the next button 1606 (e.g., after obtaining feedback from the consumer) to allow the consumer to navigate to another stage in the sampling process.

FIG. 17 illustrates an example of a graphical user interface 1700 of the interaction module 406. The graphical user interface 1700 includes a reward button 1702, a progress bar 1704, and a next button 1706. A consumer can click on the reward button 1702 to receive a reward associated with the product sampling process. The interaction module 406 prompts the consumer to enter their phone number through the user interface 1700. After obtaining the phone number from the consumer, the interaction module 406 can communicate the reward associated with the product sampling process to the phone associated with the obtained phone number. The interaction module 406 presents for display on the graphical user interface 1700 the next button 1706 (e.g., after communicating the reward to the consumer) to allow the consumer to navigate to another stage in the sampling process. In some implementations, the interaction module 406 receives personal details of the consumer including at least one of residential address, or email address through the user interface 1700.

FIG. 18 illustrates an example of a graphical user interface 1800 of the interaction module 406. The graphical user interface 1800 includes a message "Thanks for participating!" 1802, a progress bar 1804 that shows the completion of the product sampling process, and an end button 1806. The interaction module 406 displays messages indicating that the consumer has successfully completed the product sampling process.

While the implementations described above for graphical user interfaces 1200-1800 indicate display of the graphical user interfaces in a particular order, in some implementations those graphical user interfaces 1200-1800 can be presented in any other suitable order. In certain implementations, the order in which those graphical user interfaces 1200-1800 are presented can be customized on the device 102 by an authorized user by inputting authentication information, which once accepted can allow modification of that order. The user-interaction on the graphical user interfaces 1200-1800 are shown as questions or messages. In some implementations, these questions or messages can be preset, and can be presented in any preset order. In certain implementations, any subsequent question or message can be varied based on input provided by a consumer to a previous question or message. In a few implementations, one or more questions can be generated in real-time and customized for each consumer based on the interaction with that specific consumer. In some implementations, many of the interactions (e.g. any number of questions or messages) can be on a single graphical user interface instead of separate graphical user interfaces.

Figure 19:
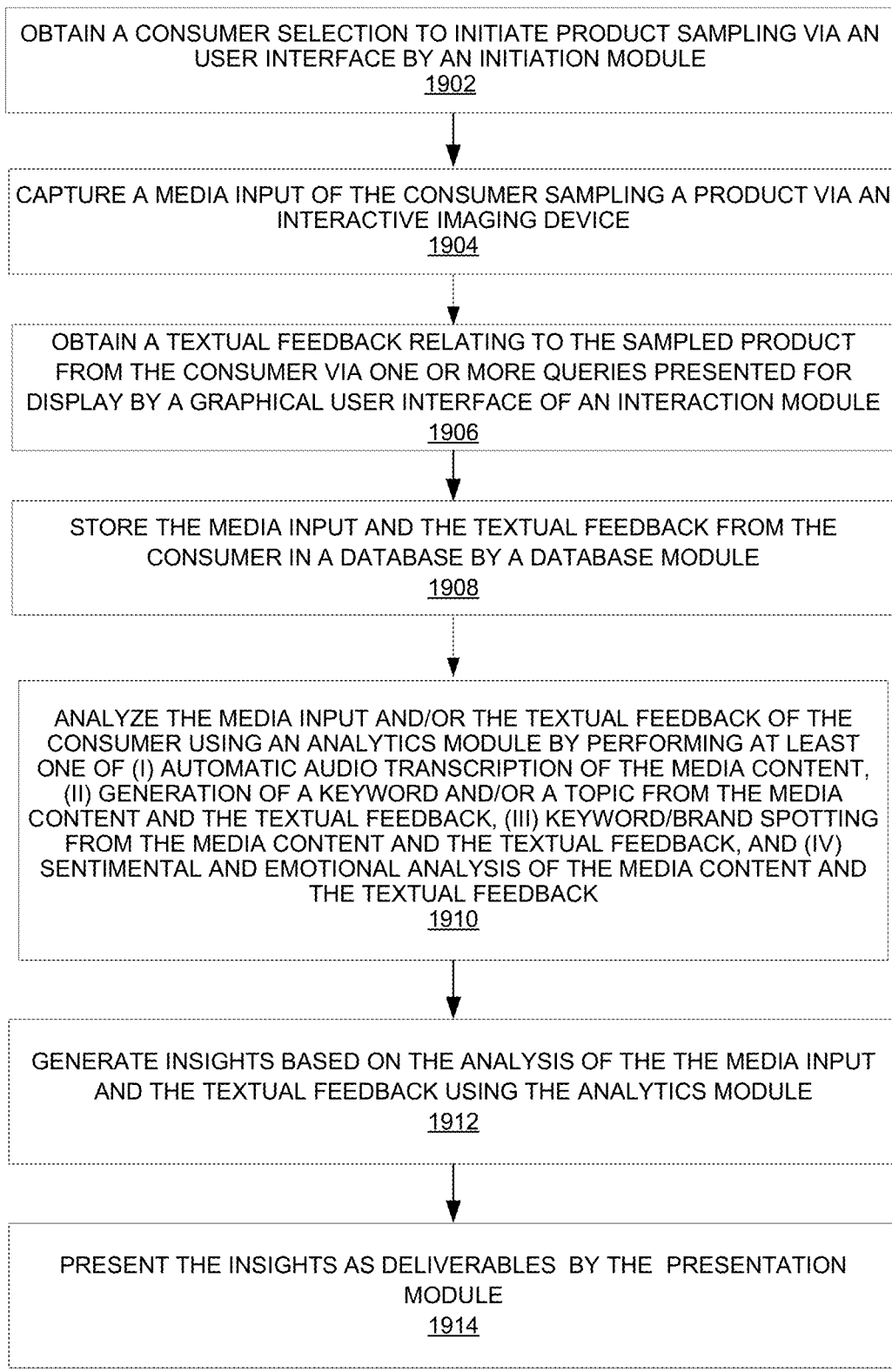
FIG. 19 is a flow diagram for an example process of presenting insights.

FIG. 19 is a flow diagram for an example process of presenting insights. The example process will be described as being performed by a system of one or more computers programmed in accordance with this specification. For example, the interactive product sampling and insights generation system 100 can perform the example process.

The system can obtain, at 1902, a consumer selection to initiate product sampling via a user interface of an initiation module 402.

The system can capture, at 1904, a media input of the consumer sampling a product via an interactive imaging device 102. The interactive imaging device 102 can include a touch screen that can provide information and receive information from the consumer.

The system can obtain, at 1906, a textual feedback relating to the sampled product from the consumer via one or more queries presented for display on a graphical user interface of an interaction module.

The system can store, at 1908, the media input and/or the textual feedback from the consumer in a database of a database module 404.

The system can analyze, at 1910, the media input and/or the textual feedback of the consumer using an analytics module by performing at least one of (i) automatic audio transcription of the media input, (ii) generation of a keyword and/or a topic from audio transcription associated with the media input, (iii) keyword/brand spotting on the audio transcription associated with the media input and/or the textual feedback, and (iv) sentimental and emotional analysis of the media input and/or the textual feedback.

The system can generate, at 1912, insights based on the analysis of the media input and/or the textual feedback using the analytics module 408.

The system can present, at 1914, the insights as deliverables by a presentation module 410 on a communication device.

Figure 20:
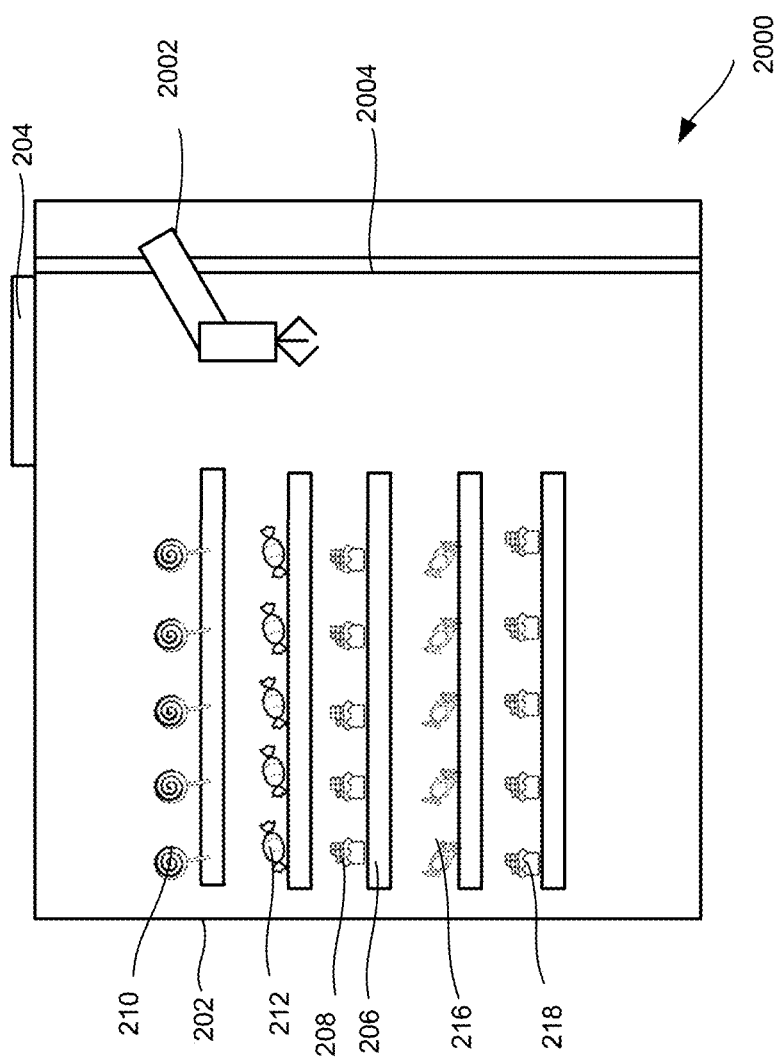
FIG. 20 illustrates a robotic arm sample retrieval unit.

FIG. 20 illustrates robotic arm sample retrieval unit 2000. The robotic arm sample retrieval unit 2000 includes a robotic arm 2002, a shaft 2004, a housing 202, a vending unit 204, a product sample holding receptacle 206, and an electronic control module 2010 (not shown in FIG. 20).

The product samples are placed on the product sample holding receptacle 206 placed inside the housing 202. In some implementations, the product sample includes at least one of chocolate wafer cups 208, lollipops 210, caramel toffee 212, dark chocolate 216, and vanilla wafer cups 218.

The robotic arm 2002 is connected to the shaft 2004 and is configured to move on the shaft 2004 both in the upward and downward directions. The robotic arm 2002 includes a telescopic extender that is configured to move in three dimensions to reach the product samples placed on the product sample holding receptacle 206. The electronic control module 2010 actuates/controls the robotic arm 2002 on receiving information from the sampling subsystem 100. The robotic arm 2002 locates the product samples in a pre-defined position in the product sample holding receptacle 206 and dispenses the product samples through the vending unit 204. In some implementations, the sampling subsystem 100 comprises more than one robotic arm 2002 that can be provided to facilitate retrieval of the product samples from the sampling subsystem 100. In some implementations, the product samples can be placed on the product sample holding receptacle 206 directly without wrapping over the product sample.

Figure 21:
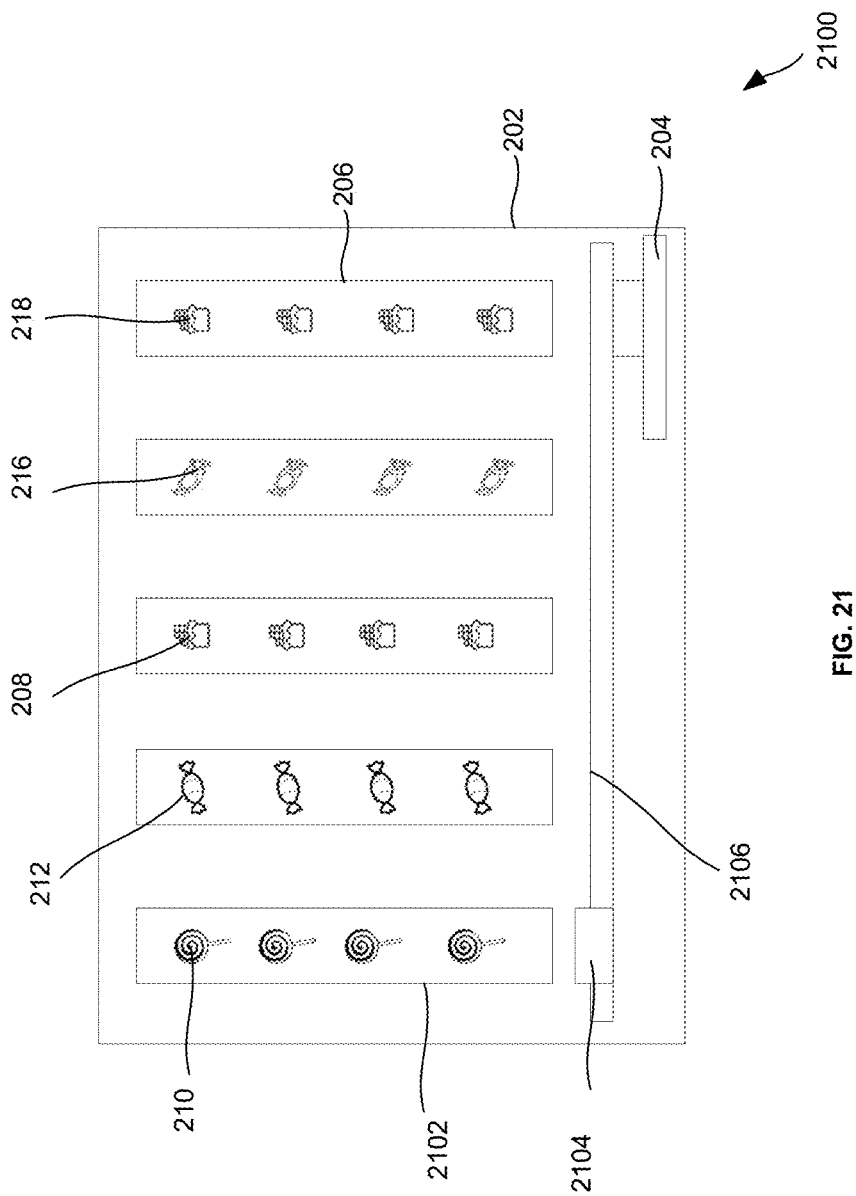
FIG. 21 illustrates a conveyor belt assisted product sample retrieval system.

FIG. 21 illustrates a conveyor belt assisted product sample retrieval system 2100. The conveyor belt assisted product sample retrieval system 2100 includes a conveyor belt 2102, a product sample receiver 2104, a shaft 2106, a housing 202, a vending unit 204, a product sample holding receptacle 206, and the electronic control module 2010 (not shown in FIG. 21).

The product samples are placed on the product sample holding receptacle 206 placed inside the housing 202. In some examples, the product sample includes at least one of chocolate wafer cups 208, lollipops 210, caramel toffee 212, dark chocolate 216, and vanilla wafer cups 218.

The product samples are placed on the conveyor belt 2102 at a pre-determined location. The product sample receiver 2104 is attached to the shaft 2106 and it is configured to move on the shaft 2106 both in the forward and backward directions. The electronic control module 2010 actuates/controls the corresponding conveyor belt 2102 and the product sample receiver 2104. The conveyor belt 2102 moves, so that a product sample gets released from the conveyor belt 2102 and the released product sample is obtained by the product sample receiver 2104. The electronic control module 2010 moves the product sample receiver 2104 along the shaft 2106 and dispenses the product samples through the vending unit 204.

Figure 22:
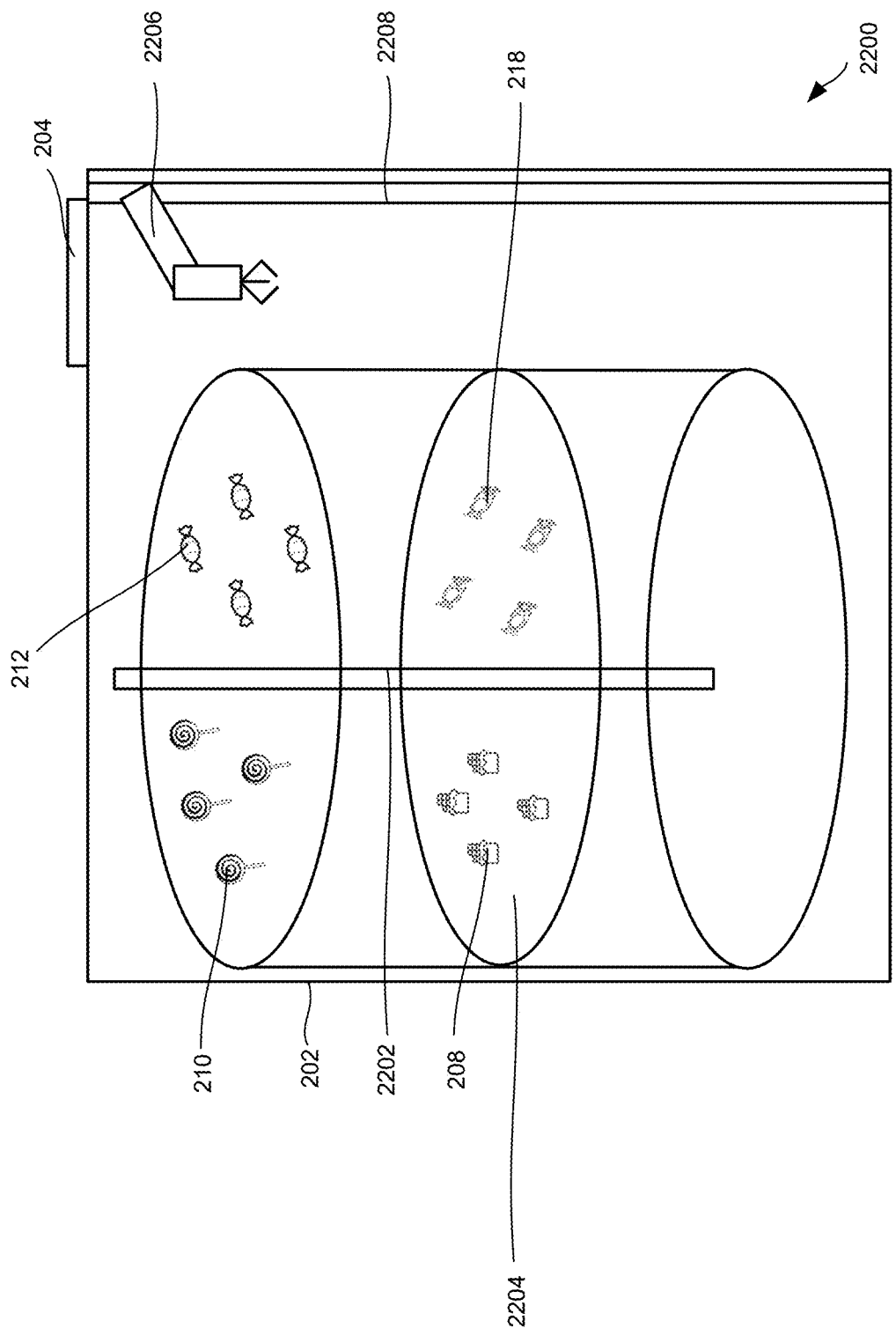
FIG. 22 illustrates a carousel assisted product sample retrieval system.

FIG. 22 illustrates a carousel assisted product sample retrieval system 2200. The carousel assisted product sample retrieval system 2200 includes a rotating shaft 2202, a product holding receptacle 2204, a pick robot 2206, a shaft 2208, a motor 2210 (not shown in FIG. 22), a housing 202, a vending unit 204, and the electronic control module 2010 (not shown in FIG. 22).

The product samples are placed on the rotating product holding receptacle 2204 placed inside the housing 202. In some implementations, the product sample includes at least one of chocolate wafer cups 208, lollipops 210, caramel toffee 212, dark chocolate 216, and vanilla wafer cups 218.

The pick robot 2206 is attached to the shaft 2208 and it is configured to move on the shaft 2208 both in the upward and downward directions. The electronic control module 2010 actuates the motor 2210 which is configured to rotate the product holding receptacle 2204 through the rotating shaft 2202 into alignment with the pick robot 2206, which is configured to move on the shaft 2204 both in the upward and downward directions. The electronic control module 2010 actuates/controls the pick robot 2206 to remove product samples from the product holding receptacle 2204 and dispense through the vending unit 204. The pick robot 2206 moves on the shaft 2204 corresponding to the selected product holding receptacle 2204 to pick the product samples.

Figure 23:
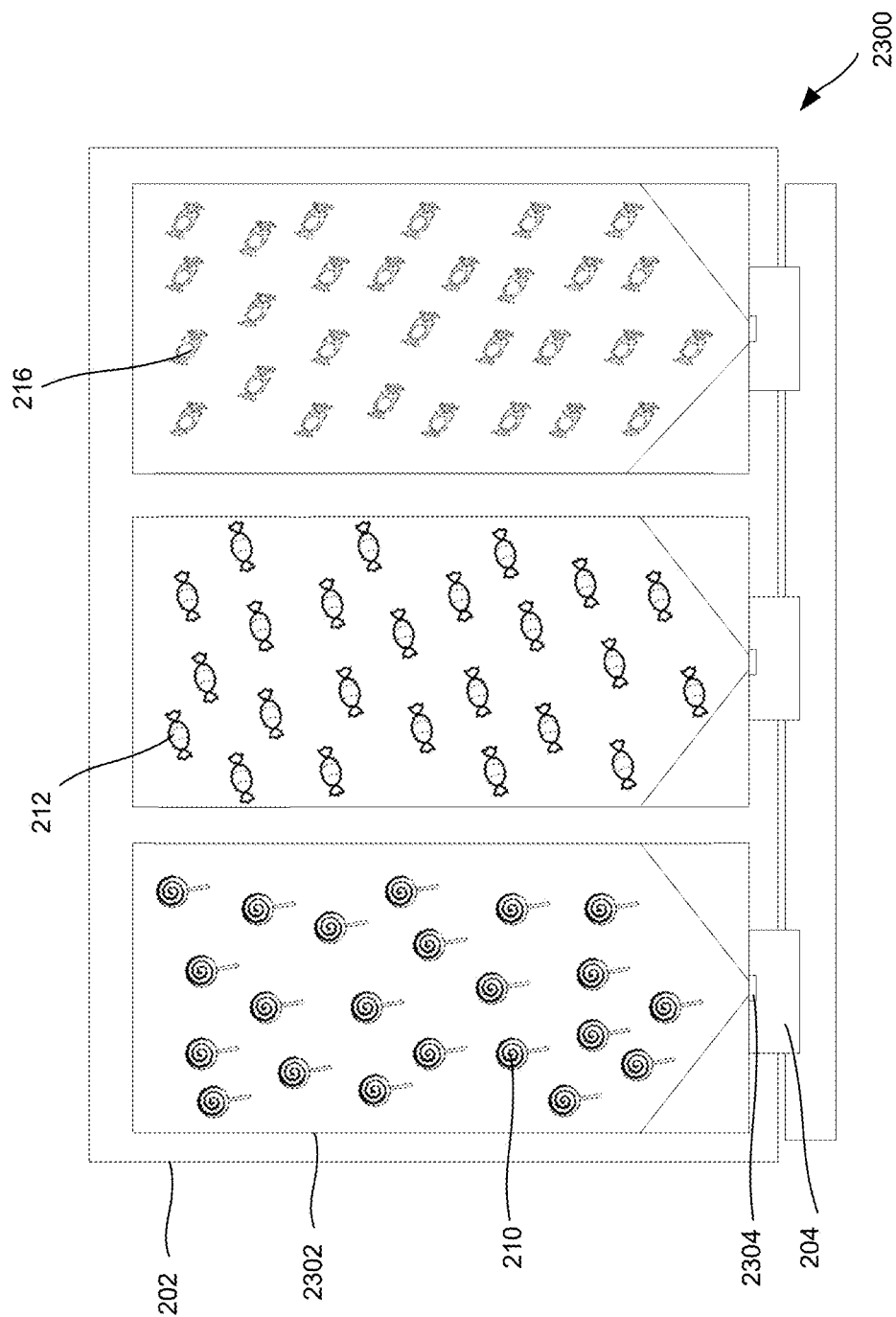
FIG. 23 illustrates a product sample retrieval system.

FIG. 23 illustrates a product sample retrieval system 2300. The product sample retrieval system 2300 includes a product holding chamber 2302, a sample releasing unit 2304, a vending unit 204, and the electronic control module 2010 (not shown in FIG. 23).

The product sample can be stored in the product holding chamber 2202 inside the housing 202. In some implementations, the product sample includes at least one of lollipops 210, caramel toffee 212, and dark chocolate 216.

The electronic control module 2010 actuates/controls the sample releasing unit 2204 to move and release a product sample from the product holding chamber 2202 into the vending slot 204. In some implementations, the interactive product sampling and insights generation system 100 comprises multiple product holding chamber 2202 that can be included to store multiple product samples.

Figure 24:
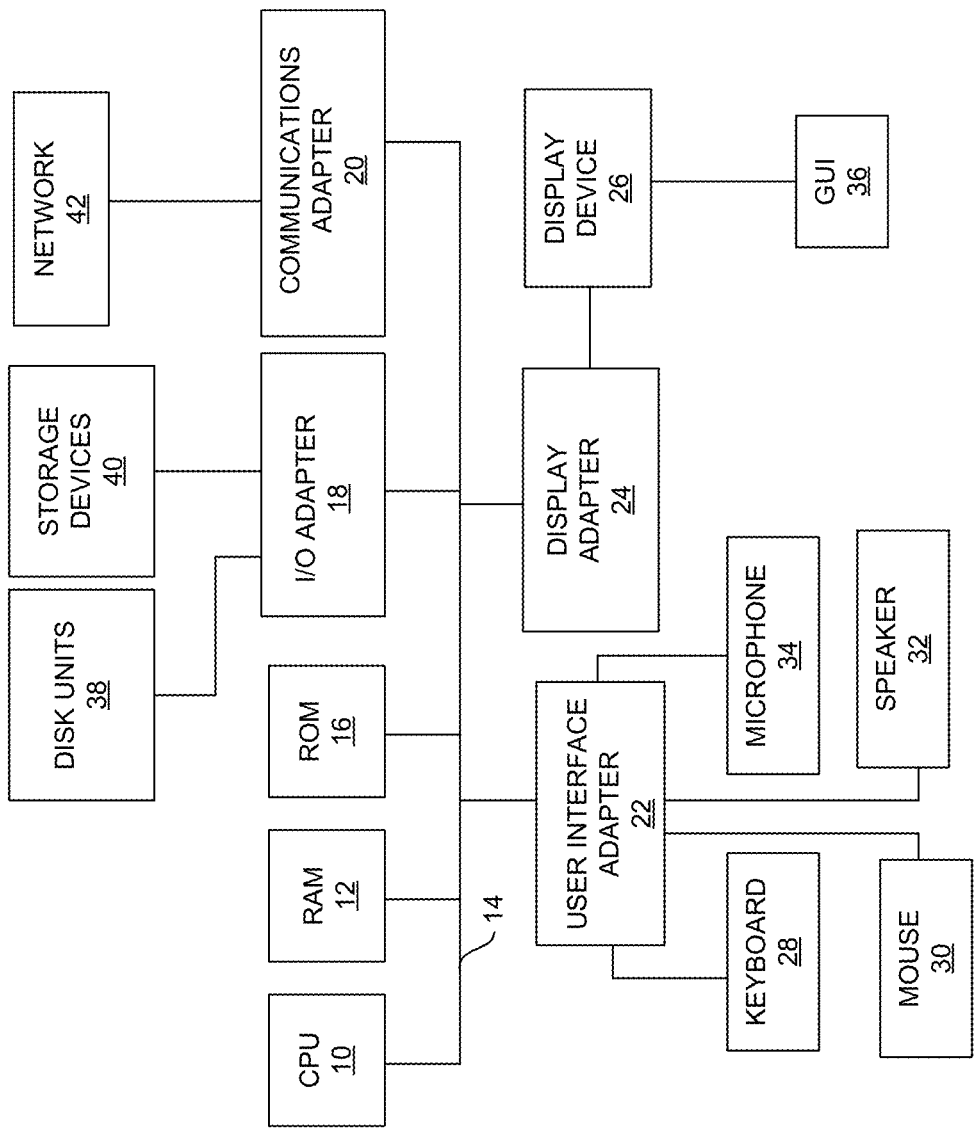
FIG. 24 illustrates one example of at least some computing devices described herein for implementing various implementations described herein.

FIG. 24 illustrates one example of some computing devices described herein for implementing various implementations described herein. This schematic drawing illustrates a hardware configuration of a server, computer system, and/or computing device in accordance with the implementations described herein. The system includes at least one processing device CPU 10 that can be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read instructions on the program storage devices 40 and follow the instructions to execute the methodology of the implementations described herein.

The system further includes a user interface adapter 22 that connects a keyboard 28, mouse 30, speaker 32, microphone 34, and/or other user interface devices, such as a touch screen device (not shown), to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the implementations described herein, or which can be embodied as an output device such as a monitor, printer, or transmitter, for example.

The foregoing description of the specific implementations will so fully reveal the general nature of the implementations described herein that others can, by applying current knowledge, readily modify and/or adapt for various applications without departing from the generic concept, and, therefore, such adaptations and modifications should be comprehended within the meaning and range of equivalents of the disclosed implementations. It is to be understood that the phraseology or terminology employed herein is for the purpose of description and not of limitation. Therefore, while the implementations described herein have been described in terms of preferred implementations, those skilled in the art will recognize that the implementations described herein can be practiced with modification within the spirit and scope.

The implementations described herein and the various features and advantageous details thereof are explained more fully with reference to the non-limiting implementations that are illustrated in the accompanying drawings and detailed in the description above. Descriptions of well-known components and processing techniques may have been omitted so as to not unnecessarily obscure the implementations described herein. The examples used herein are intended merely to facilitate an understanding of ways in which the implementations described herein may be practiced and to further enable those of skill in the art to practice the implementations described herein. Accordingly, the examples should not be construed as limiting the scope of the implementations described herein.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which can also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), a GPGPU (General purpose graphics processing unit), or some other type of processor.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Computer program products are also described that comprise non-transitory computer readable media storing instructions, which when executed by at least one data processors of one or more computing systems, causes at least one data processor to perform operations herein. Similarly, computer systems are also described that can include one or more data processors and a memory coupled to the one or more data processors. The memory can temporarily or permanently store instructions that cause at least one processor to perform one or more of the operations described herein. In addition, methods can be implemented by one or more data processors either within a single computing system or distributed among two or more computing systems.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims.

The invention claimed is:

1. A system comprising:
a sampling subsystem to distribute one or more samples of a food or drink product to a consumer, wherein the sampling subsystem comprises:
one or more food or drink product holding receptacles to hold the one or more samples of the food or drink product, and
a movable component to retrieve the one or more samples of the food or drink product from the one or more food or drink product holding receptacles;
an interactive imaging device communicatively coupled to the sampling subsystem to acquire images of the consumer while the consumer consumes the one or more samples of the food or drink product, wherein the acquired images comprise images of one or more facial expressions of the consumer while the consumer consumes the one or more samples of the food or drink product; and
a cloud computing server remotely coupled to the interactive imaging device by way of a communication network to deploy one or more machine learning models trained on a plurality of facial expressions of one or more of the consumer or other individuals, wherein
the deployment of the one or more trained machine learning models comprises providing the acquired images as input to the one or more trained machine learning models to generate real-time machine-learning inferences specific to the one or more samples of the food or drink product and the one or more facial expressions of the consumer, and
wherein the cloud computing server is configured to generate customized data associated with the one or more samples of the food or drink product based on the real-time machine-learning inferences.

2. The system of claim 1, wherein the sampling subsystem further comprises:
a vending unit to dispense the one or more samples of the food or drink product to the consumer.

3. The system of claim 2, wherein the movable component comprises a robotic arm and the robotic arm is configured to move the one or more samples of the food or drink product from the one or more food or drink product holding receptacles to the vending unit.

4. The system of claim 1, wherein the cloud computing server comprises:
an interaction module is configured to receive, from the interactive imaging device, a media input comprising the acquired images; and
an analytics module that implements the one or more machine learning models to analyze the media input to generate the real-time machine-learning inferences.

5. The system of claim 4, wherein the media input further comprises a video of the consumer consuming the one or more samples of the food or drink product.

6. The system of claim 5, wherein the acquired images are obtained in response to tasks or questions displayed on the interactive imaging device, wherein the tasks or questions are superimposed on the video of the consumer consuming the one or more samples of the food or drink product.

7. The system of claim 4, wherein the interaction module is configured to receive the media input from an interactive graphical user interface of the interactive imaging device.

8. The system of claim 7, wherein the graphical user interface is configured to:
sequentially display a plurality of questions;
receive a plurality of responses to the plurality of questions from a consumer of the plurality of consumers; and
display progress indicating a portion of the plurality of responses that have been answered by the consumer.

9. The system of claim 4, wherein the generating of the real-time machine-learning inferences comprises:
automatically transcribing data within the media input;
identifying at least one of keywords or topics from the transcribed data, wherein the identifying comprises performing sentimental and emotional analysis on the transcribed data to generate the at least one of keywords or topics; and
generating the real-time machine-learning inferences based on the at least one of keywords or topics.

10. The system of claim 4, wherein the cloud computing server further comprises a presentation module configured to transmit the real-time machine-learning inferences to a computing device for presentation of the real-time machine-learning inferences on the computing device.

11. A method comprising:
distributing, by a sampling subsystem, one or more samples of a food or drink product to a consumer, comprising:
holding, by one or more food or drink product holding receptacles of the sampling subsystem, the one or more samples of the food or drink product; and
retrieving, by a movable component of the sampling subsystem, the one or more samples of the food or drink product from the one or more food or drink product holding receptacles;
acquiring, by an interactive imaging device communicatively coupled to the sampling subsystem, images of the consumer while the consumer consumes the one or more samples of the food or drink product, wherein the acquired images comprise images of one or more facial expressions of the consumer while the consumer consumes the one or more samples of the food or drink product;
deploying, by a server coupled to the interactive imaging device by way of a communication network, one or more machine learning models trained on a plurality of facial expressions of one or more of the consumer or other individuals, wherein
the deploying of the one or more trained machine learning models comprises providing the acquired images as input to the one or more trained machine learning models to generate real-time machine-learning inferences specific to the one or more samples of the food or drink product and the one or more facial expressions of the consumer, generating, by the server, customized data associated with the one or more samples of the food or drink product based on the real-time machine-learning inferences.

12. The method of claim 11, wherein distributing the one or more samples of the food or drink product further comprises:

dispensing, by a vending unit of the sampling subsystem, the one or more samples of the food or drink product to the consumer.

13. The method of claim 12, wherein the movable component comprises a robotic arm and the robotic arm is configured to move the one or more samples of the food or drink product from the one or more food or drink product holding receptacles to the vending unit.

14. The method of claim 11, wherein the generating of the real-time inferences comprises:

receiving, by an interaction module of the server and from the interactive imaging device, a media input comprising the acquired images; and analyzing, by deploying the one or more machine learning models implemented by an analytics module of the server, the media input to generate the real-time inferences.

15. The method of claim 14, wherein the receiving of the media input comprises receiving the media input from an interactive graphical user interface of the interactive imaging device.

16. The method of claim 15, wherein the interactive graphical user interface is configured to perform operations comprising:

sequentially displaying a plurality of questions;

receiving a plurality of responses to the plurality of questions from the consumer; and displaying progress indicating a portion of the plurality of responses that have been answered by the consumer.

17. The method of claim 14, wherein the generating of the real-time inferences comprises:

automatically transcribing data within the media input;

identifying at least one of keywords or topics from the transcribed data, wherein the identifying comprises performing sentimental and emotional analysis on the transcribed data to generate the at least one of keywords or topics; and generating the real-time inferences based on the at least one of keywords or topics.

18. The method of claim 11, further comprising:

transmitting, by a presentation module of the server, the real-time inferences to a computing device for presentation of the real-time inferences on the computing device.

* * * * *